(12) United States Patent
Senzaki et al.

(10) Patent No.: US 9,029,073 B2
(45) Date of Patent: May 12, 2015

(54) UNDERCOAT AGENT, AND PATTERN FORMATION METHOD FOR LAYER CONTAINING BLOCK COPOLYMER

(71) Applicant: Tokyo Ohka Kogyo Co., Ltd., Kawasaki-shi (JP)

(72) Inventors: Takahiro Senzaki, Kawasaki (JP); Ken Miyagi, Kawasaki (JP); Kenichiro Miyashita, Kawasaki (JP)

(73) Assignee: Tokyo Ohka Kogyo Co., Ltd., Kawasaki-shi (JP)

( * ) Notice: Subject to any disclaimer, the term of this patent is extended or adjusted under 35 U.S.C. 154(b) by 0 days.

(21) Appl. No.: 13/786,007

(22) Filed: Mar. 5, 2013

(65) Prior Publication Data
US 2013/0252179 A1 Sep. 26, 2013

(30) Foreign Application Priority Data

Mar. 14, 2012 (JP) ................. 2012-057815

(51) Int. Cl.
*G03F 7/26* (2006.01)
*C09D 133/14* (2006.01)
*C09J 133/26* (2006.01)

(52) U.S. Cl.
CPC ............. *C09D 133/14* (2013.01); *C09J 133/26* (2013.01)

(58) Field of Classification Search
CPC ..... C08L 53/00; C08L 2666/24; B82Y 30/00; B82Y 40/00; B82Y 35/00; B81C 1/00031; B81C 2201/0149; B81C 2201/0198; B81C 1/00015; B81C 1/00246; G03F 7/0002; G03F 7/165; G03F 7/40; G03F 7/004; G03F 7/2002; H01L 21/31; H01L 21/0337; H01L 21/31144

USPC .......................................... 430/322, 328, 330
See application file for complete search history.

(56) References Cited

U.S. PATENT DOCUMENTS

| 5,945,517 A | 8/1999 | Nitta et al. |
| 6,153,733 A | 11/2000 | Yukawa et al. |
| 2002/0058204 A1* | 5/2002 | Khojasteh et al. .......... 430/270.1 |
| 2008/0193658 A1* | 8/2008 | Millward ...................... 427/401 |

(Continued)

FOREIGN PATENT DOCUMENTS

| JP | A-11-035551 | 2/1999 |
| JP | A-11-035552 | 2/1999 |

(Continued)

OTHER PUBLICATIONS

Hinsberg et al., "Self-Assembling Materials for Lithographic Patterning: Overview, Status and Moving Forward", Proceedings of SPIE vol. 7367, 76370G-1-76370G-11, (2010).

(Continued)

*Primary Examiner* — Caleen Sullivan
(74) *Attorney, Agent, or Firm* — Knobbe Martens Olsen & Bear, LLP

(57) ABSTRACT

A undercoat agent used for performing phase separation of a layer formed on a substrate and containing a block copolymer having a plurality of blocks bonded, wherein the undercoat agent contains a resin component, the resin component is formed from a structural unit having an aromatic ring and a structural unit not having an aromatic ring, and the resin component has a group that can interact with the substrate, and also has a 3 to 7-membered, ether-containing cyclic group.

14 Claims, 1 Drawing Sheet

(56) References Cited

U.S. PATENT DOCUMENTS

| | | |
|---|---|---|
| 2009/0179001 A1 | 7/2009 | Cheng et al. |
| 2012/0048738 A1 | 3/2012 | Fujikawa et al. |
| 2012/0088188 A1 | 4/2012 | Trefonas et al. |

FOREIGN PATENT DOCUMENTS

| | | |
|---|---|---|
| JP | A-11-035573 | 2/1999 |
| JP | A-11-322707 | 11/1999 |
| JP | A-2008-036491 | 2/2008 |
| JP | A-2011-079877 | 4/2011 |
| JP | A-2012-078828 | 4/2012 |
| WO | WO 2009/117238 A2 | 9/2009 |
| WO | WO 2009/117243 A1 | 9/2009 |

OTHER PUBLICATIONS

Ross, C. A. et al, "Templated self-assembly of Si-containing block copolymers for nanoscale device fabrication", Proc. Of SPIE vol. 7637, 76370H-1 (2010).

Cheng, Joy Y. et al, "Dense Self-Assembly on Sparse Chemical Patterns: Rectifying and Multiplying Lithographic Patterns Using Block Copolymers", Advanced Materials 20, 3155-3158 (2008).

Notification (Information Statement) in Japanese Patent Application No. 2012-057815, mailed on Feb. 24, 2015.

* cited by examiner

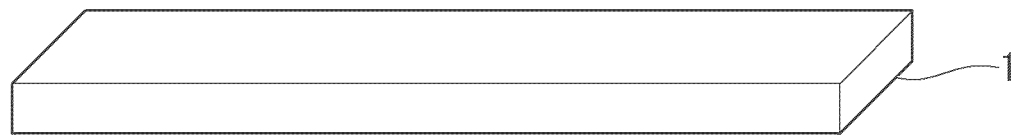
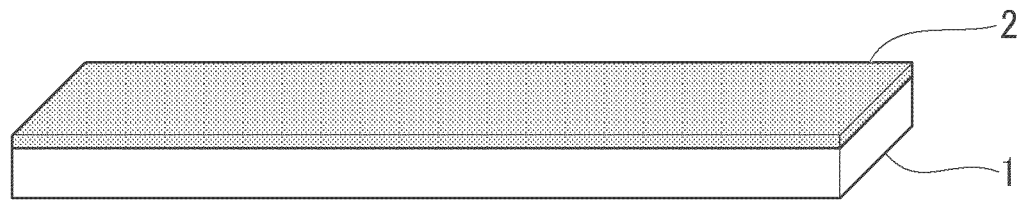
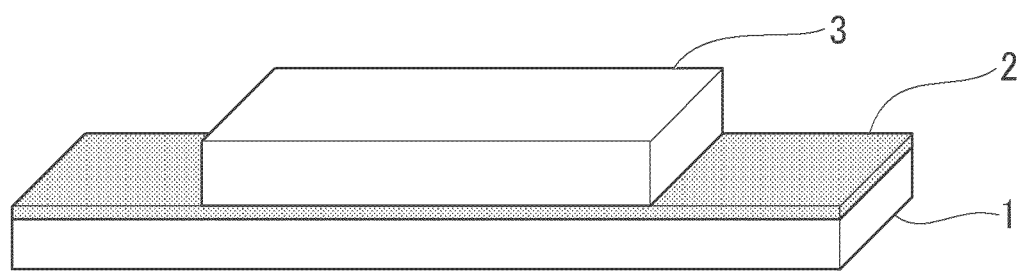
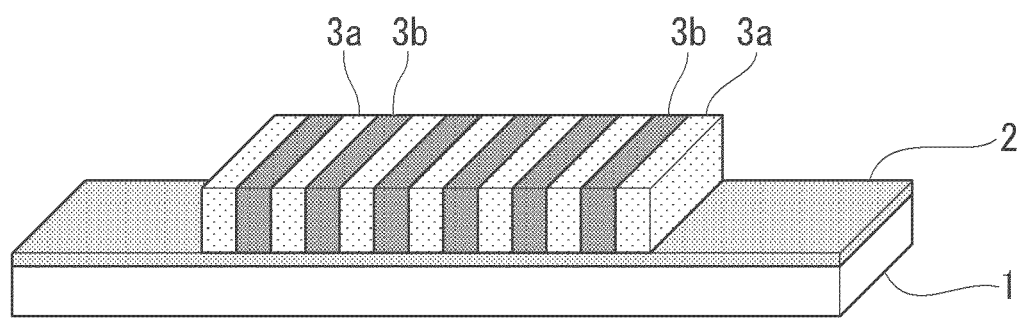
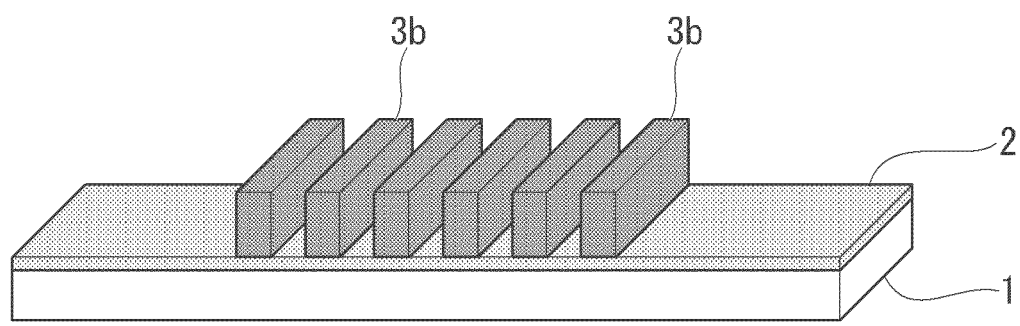

UNDERCOAT AGENT, AND PATTERN FORMATION METHOD FOR LAYER CONTAINING BLOCK COPOLYMER

BACKGROUND OF THE INVENTION

1. Field of the Invention

The present invention is related to an undercoat agent which is used for phase separating a layer including a block copolymer having a plurality of blocks bonded formed on a substrate, and a method of forming a pattern of a layer containing a block copolymer by using the undercoating agent.

Priority is claimed on Japanese Patent Application No. 2012-057815, filed Mar. 14, 2012, the content of which is incorporated herein by reference.

2. Description of Related Art

In recent years, the continued miniaturization of large scale integrated circuits (LSI) has lead to demands for techniques capable of processing ever finer structures. In response to these demands, testing has commenced into the formation of finer patterns using phase separation structures that are formed by the self-assembly of block copolymers containing mutually immiscible blocks bonded together.

In order to utilize this type of block copolymer phase separation, a self-assembled nanostructure formed by microphase separation must be formed within only a specific region, and must be oriented in a desired direction. In order to achieve this positional control and orientation control, methods such as graphoepitaxy, which controls the phase separation pattern using a guide pattern, and chemical epitaxy, which controls the phase separation pattern based on differences in the chemical state of the substrate, have been proposed (for example, see Non-Patent Document 1).

One method that has been proposed for achieving favorable phase separation of a block copolymer, thus enabling formation of a very fine pattern, is a method in which a neutral layer having a surface free energy that is between the surface free energy values of two block chains is formed on the substrate, so that the surface on the substrate with which the block copolymer makes contact has a surface free energy value that is between the surface free energy values of the two block chains (for example, see Patent Document 1).

DOCUMENTS OF RELATED ART

Patent Document

[Patent Document 1] Japanese Unexamined Patent Application, First Publication No. 2008-36491

Non-Patent Document

[Non-Patent Document 1] Proceedings of SPIE, vol. 7637, 76370G-1 (2010).

SUMMARY OF THE INVENTION

However, in the method disclosed in Patent Document 1, the surface free energy of the neutral layer must be controlled, with the material for the neutral layer being selected in each case so as to have a surface free energy value that is appropriate for the type of block copolymer being used. Accordingly, a undercoat agent that can be used in a simpler manner, and enables formation of a favorable pattern via phase separation of a block copolymer has been keenly sought.

The present invention takes the above circumstances into consideration, with an object of providing a undercoat agent which, by utilizing phase separation of a block copolymer, can produce a substrate containing a nanostructure, the positioning and orientation of which can be designed freely, formed on the substrate surface, as well as providing a pattern formation method for a layer containing a block copolymer that uses the undercoat agent.

In order to address the issues mentioned above, the present invention employs the following aspects.

As a result of intensive investigation, the inventors of the present invention discovered that by using a undercoat agent having a specific resin component for performing phase separation of a layer containing a block copolymer, a favorable pattern could be obtained by phase separation without having to control the surface free energy of the layer composed of the undercoat agent, and they also found that a layer composed of the undercoat agent could be formed as a thin film, and they were thus able to complete the present invention.

In other words, a first aspect of the present invention is a undercoat agent used for performing phase separation of a layer formed on a substrate and containing a block copolymer having a plurality of blocks bonded, wherein the undercoat agent contains a resin component, the resin component includes a structural unit having an aromatic ring and a structural unit not having an aromatic ring, and the resin component includes a group that can interact with the substrate, and also includes a 3 to 7-membered, ether-containing cyclic group.

A second aspect of the present invention is a pattern formation method for a layer containing a block copolymer, the method including: a step (1) of applying the undercoat agent of the first aspect to a substrate, and forming a layer composed of the undercoat agent, a step (2) of forming a layer containing a block copolymer having a plurality of blocks bonded on the surface of the layer composed of the undercoat agent, and then performing phase separation of the layer containing the block copolymer, and a step (3) of selectively removing, from the layer containing the block copolymer, a phase composed of at least one type of block among the plurality of types of blocks that constitute the block copolymer.

In the present description and the claims, the term "aliphatic" is a relative concept used in relation to the term "aromatic", and defines a group or compound or the like that has no aromaticity.

The term "alkyl group" includes linear, branched and cyclic monovalent saturated hydrocarbon groups, unless specified otherwise. This definition also applies to the alkyl group within an alkoxy group.

The term "alkylene group" includes linear, branched and cyclic divalent saturated hydrocarbon groups, unless specified otherwise.

A "halogenated alkyl group" is a group in which part or all of the hydrogen atoms of an alkyl group have each been substituted with a halogen atom, and a "halogenated alkylene group" is a group in which part or all of the hydrogen atoms of an alkylene group have each been substituted with a halogen atom. Examples of the halogen atom include a fluorine atom, a chlorine atom, a bromine atom and an iodine atom.

A "hydroxyalkyl group" is a group in which part or all of the hydrogen atoms of an alkyl group have each been substituted with a hydroxyl group.

The term "structural unit" refers to a monomer unit that contributes to the formation of a polymeric compound (a resin, polymer or copolymer).

The term "exposure" is used as a general concept that includes irradiation with any form of radiation.

A "block" is a partial structural component, which is composed only of the same type of structural unit bonded together, and constitutes part of a block copolymer.

The term "(meth)acrylic acid" is a generic term that includes either or both of acrylic acid having a hydrogen atom bonded to the α-position and methacrylic acid having a methyl group bonded to the α-position.

The term "(meth)acrylate ester" is a generic term that includes either or both of the acrylate ester having a hydrogen atom bonded to the α-position and the methacrylate ester having a methyl group bonded to the α-position.

The term "(meth)acrylate" is a generic term that includes either or both of the acrylate having a hydrogen atom bonded to the α-position and the methacrylate having a methyl group bonded to the α-position.

According to the undercoat agent of the present invention, by using phase separation of a block copolymer, a substrate provided with a nanostructure on the surface thereof can be simply produced, wherein the nanostructure is more freely designed with respect to the positioning and the orientation thereof. Moreover, when the undercoat agent of the present invention is used, a film having the aforementioned function can be formed as a comparatively thin film on the substrate, and therefore the effects of the layer composed of the undercoat agent on subsequent steps is minimal, and removal of the layer composed of the undercoat agent is comparatively simple.

Further, in the pattern formation method for a layer containing a block copolymer according to the present invention, by using the undercoat agent mentioned above, a substrate containing a nanostructure for which the positioning and orientation have been designed with a superior degree of freedom can be produced.

BRIEF DESCRIPTION OF THE DRAWINGS

FIG. 1 is a schematic process diagram explaining an embodiment of the pattern formation method for a layer containing a block copolymer according to the present invention.

DETAILED DESCRIPTION OF THE INVENTION

<<Undercoat Agent>>

The undercoat agent of the first aspect of the present invention contains at least a resin component, and is used for performing phase separation of a layer formed on a substrate and containing a block copolymer having a plurality of blocks bonded. Specifically, by applying the undercoat agent to the substrate to provide a layer composed of the undercoat agent on the substrate, and then forming a layer containing a block copolymer having a plurality of types of blocks on the undercoat agent, the substrate surface, which has the layer composed of the undercoat agent formed thereon, is able to exhibit a high level of affinity for each of the blocks that constitute the block copolymer.

Descriptions of the phase separation of the layer containing the block copolymer, and the pattern formation method for the layer containing the block copolymer, both of which can use the undercoat agent of the present invention, are presented below within the description of the second aspect.

<Resin Component (A)>

The undercoat agent of the present invention contains at least a resin component (A) (hereafter also referred to as "component (A)").

In the present description and the claims, the term "resin component" refers to a polymer having a molecular weight of at least 1,000. The polystyrene-equivalent weight-average molecular weight determined by gel permeation chromatography (GPC) is used as the molecular weight of the polymer.

The component (A) of the present invention includes a structural unit (a1) having an aromatic ring and a structural unit (a2) not having an aromatic ring.

Further, the component (A) of the present invention includes a group that can interact with the substrate, and also includes a 3 to 7-membered, ether-containing cyclic group. The "group that can interact with the substrate" (hereafter also referred to as the "substrate interaction group") may be included within the structural unit (a1) or within the structural unit (a2).

[Structural Unit (a1)]

The structural unit (a1) is a structural unit having an aromatic ring. By including a structural unit having an aromatic ring as the structural unit (a1), the component (A) is able to exhibit an appropriate level of affinity for the block copolymer in those cases where a block copolymer having blocks with a variety of different properties is used.

The aromatic ring preferably contains 6 to 18 carbon atoms, and specific examples include aromatic hydrocarbon rings such as benzene, biphenyl, fluorene, naphthalene, anthracene and phenanthrene, and aromatic heterocyclic rings in which a portion of the carbon atoms that constitute an aforementioned aromatic hydrocarbon ring has been substituted with a hetero atom. Examples of the hetero atom in the aromatic heterocyclic ring include an oxygen atom, a sulfur atom and a nitrogen atom.

Provided the structural unit (a1) has an aromatic ring, there are no particular limitations on the remaining structures within the structural unit. Examples of compounds that can be used for the structural unit (a1) include:
  aromatic compounds (compounds containing an aromatic ring) having a vinyl group,
  aromatic compounds having a (meth)acryloyl group, and
  phenolic compounds that function as structural components of novolac resins.

Among these, preferred structural units include structural units derived from compounds composed of an aromatic ring which may have a substituent, wherein one of the hydrogen atoms bonded to the carbon atoms that form the ring is substituted with a vinyl group, and structural units derived from acrylic acid or an ester thereof, in which the hydrogen atom bonded to the carbon atoms on the α-position may be substituted with a substituent, and in which the structural unit also has an aromatic ring. Here, the "vinyl group" may also be a group in which the carbon atom of the vinyl group that is bonded to the aromatic ring may have a substituent.

A structural unit derived from styrene or a derivative thereof, vinylnaphthalene or a derivative thereof, or vinylanthracene or a derivative thereof is particularly preferable as the structural unit (a1).

Examples of the "styrene or derivative thereof" include styrenes in which the hydrogen atom bonded to the carbon atom on the α-position may be substituted with a substituent, and in which a hydrogen atom bonded to the benzene ring may be substituted with a substituent other than a hydroxyl group (hereafter a styrene in which the hydrogen atom bonded to the carbon atom on the α-position is substituted with a substituent may be referred to as an "α-substituted styrene", and the generic term "(α-substituted) styrene" may be used to refer jointly to a styrene in which the α-position is not substituted and the α-substituted styrene (a similar naming convention also applies to other related compounds)), hydroxystyrenes in which the hydrogen atom bonded to the carbon atom on the α-position may be substituted with a substituent, and in which a hydrogen atom bonded to the benzene ring may be substituted with a substituent other than a hydroxyl group (hereafter also referred to as an "(α-substituted) hydroxystyrene"), compounds in which the hydrogen atom of the hydroxyl group of an α-substituted) hydroxystyrene has been substituted with an organic group, vinylbenzoic acids in which the hydrogen atom bonded to the carbon atom on the α-position may be substituted with a substituent, and in which a hydrogen atom bonded to the benzene ring may be substituted with a substituent other than a hydroxyl group or a carboxyl group (hereafter also referred to as an "(α-substituted) vinylbenzoic acid"), and compounds in which the hydrogen atom of the carboxyl group of an (α-substituted) vinylbenzoic acid has been substituted with an organic group.

In an α-substituted styrene, an α-substituted hydroxystyrene or an α-substituted vinylbenzoic acid, the substituent bonded to the carbon atom on the α-position is preferably a hydrogen atom, an alkyl group of 1 to 5 carbon atoms or a halogenated alkyl group of 1 to 5 carbon atoms, is more preferably a hydrogen atom, an alkyl group of 1 to 5 carbon atoms or a fluorinated alkyl group of 1 to 5 carbon atoms, and in terms of industrial availability, is most preferably a hydrogen atom or a methyl group.

The alkyl group for the α-position substituent is preferably a linear or branched alkyl group, and specific examples include a methyl group, ethyl group, propyl group, isopropyl group, n-butyl group, isobutyl group, tert-butyl group, pentyl group, isopentyl group and neopentyl group.

Further, specific examples of the halogenated alkyl group for the α-position substituent include groups in which part or all of the hydrogen atoms of an aforementioned "alkyl group for the α-position substituent" have each been substituted with a halogen atom. Examples of the halogen atom include a fluorine atom, chlorine atom, bromine atom and iodine atom, and a fluorine atom is particularly desirable.

A hydroxystyrene is a compound in which a single vinyl group and at least one hydroxyl group are bonded to a benzene ring. The number of hydroxyl groups bonded to the benzene ring is preferably from 1 to 3, and most preferably 1. There are no particular limitations on the bonding position(s) of the hydroxyl group(s) on the benzene ring. When there is only one hydroxyl group, the bonding position of the vinyl group is preferably the para-position (4th position). When the number of hydroxyl groups is an integer of two or more, any arbitrary combination of bonding positions may be used.

A vinylbenzoic acid is a compound in which a single vinyl group is bonded to the benzene ring of benzoic acid. There are no particular limitations on the bonding position of the vinyl group on the benzene ring.

There are no particular limitations on the substituent other than a hydroxyl group or a carboxyl group which may be bonded to the benzene ring of a styrene or derivative thereof, and examples include a halogen atom, an alkyl group of 1 to 5 carbon atoms, and a halogenated alkyl group of 1 to 5 carbon atoms. Examples of the halogen atom include a fluorine atom, chlorine atom, bromine atom and iodine atom, and a fluorine atom is particularly desirable.

Examples of the "vinylnaphthalene or derivative thereof" include vinylnaphthalenes in which the hydrogen atom bonded to the carbon atom on the α-position may be substituted with a substituent, and in which a hydrogen atom bonded to the naphthalene ring may be substituted with a substituent other than a hydroxyl group (hereafter also referred to as an "α-substituted) vinylnaphthalene"), vinyl (hydroxynaphthalenes) in which the hydrogen atom bonded to the carbon atom on the α-position may be substituted with a substituent, and in which a hydrogen atom bonded to the naphthalene ring may be substituted with a substituent other than a hydroxyl group (hereafter also referred to as an "(α-substituted) vinyl(hydroxynaphthalene)"), and compounds in which the hydrogen atom of the hydroxyl group of an (α-substituted) vinyl(hydroxynaphthalene) has been substituted with a substituent. In an α-substituted vinylnaphthalene or an α-substituted vinyl(hydroxynaphthalene), examples of the substituent which substitutes the hydrogen atom bonded to the carbon atom on the α-position include the same groups as those mentioned above for the substituent for an α-substituted styrene or the like.

A vinyl(hydroxynaphthalene) is a compound in which a single vinyl group and at least one hydroxyl group are bonded to a naphthalene ring. The vinyl group may be bonded to the 1st position or 2nd position of the naphthalene ring. The number of hydroxyl groups bonded to the naphthalene ring is preferably from 1 to 3, and most preferably 1. There are no particular limitations on the bonding position(s) of the hydroxyl group(s) on the naphthalene ring. When the vinyl group is bonded to the 1st position or 2nd position of the naphthalene ring, the hydroxyl group(s) are preferably bonded to any of the 5th to 8th positions. In particular, when there is only one hydroxyl group, the hydroxyl group is preferably bonded to any one of the 5th to 7th positions of the naphthalene ring, and is more preferably bonded to the 5th or 6th position. When the number of hydroxyl groups is an integer of two or more, any arbitrary combination of bonding positions may be used.

Examples of the substituent which may be bonded to the naphthalene ring of the vinylnaphthalene or derivative thereof include the same substituents as those mentioned above for the substituent which may be bonded to the benzene ring of an aforementioned (α-substituted) styrene.

Examples of the "vinylanthracene or derivative thereof" include vinylanthracenes in which the hydrogen atom bonded to the carbon atom on the α-position may be substituted with a substituent, and in which a hydrogen atom bonded to the anthracene ring may be substituted with a substituent other than a hydroxyl group. The substituents are the same as described above for the α-substituted styrene and the like.

The term "acrylate ester" describes a compound in which the terminal hydrogen atom of the carboxyl group of acrylic acid ($CH_2$=CH—COOH) has been substituted with an organic group.

In an acrylic acid in which the hydrogen atom bonded to the carbon atom on the α-position may be substituted with a substituent (hereafter also referred to as an "(α-substituted) acrylic acid") or an ester thereof, examples of the substituent which may be bonded to the carbon atom on the α-position include the same substituents as those mentioned above for the α-substituted styrene and the like. Unless specified otherwise, the α-position (the carbon atom on the α-position) of a structural unit derived from an acrylate ester refers to the carbon atom to which the carbonyl group is bonded.

There are no particular limitations on the organic group within an (α-substituted) acrylate ester.

As the structural unit (a1), a structural unit represented by one of formulas (a1-1) to (a1-4) shown below is particularly desirable.

[Chemical Formula 1]

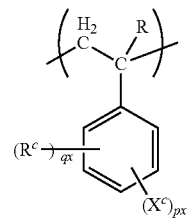

(a1-1)

-continued

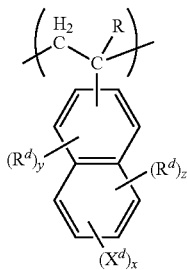

(a1-2)

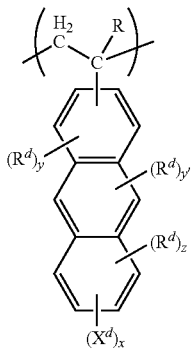

(a1-3)

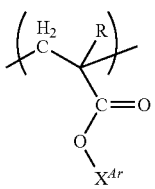

(a1-4)

In the above formulas, R represents a hydrogen atom, an alkyl group of 1 to 5 carbon atoms, or a halogenated alkyl group of 1 to 5 carbon atoms. Each of $X^c$ and $X^d$ independently represents a hydrogen atom, a hydroxyl group, a cyano group or an organic group. Each of $R^c$ and $R^d$ independently represents a halogen atom, —COOX$^e$ (wherein X$^e$ represents a hydrogen atom or an organic group), an alkyl group of 1 to 5 carbon atoms or a halogenated alkyl group of 1 to 5 carbon atoms. Further, px represents an integer of 0 to 3 and qx represents an integer of 0 to 5, provided that px+qx is from 1 to 5. When qx is an integer of 2 or greater, the plurality of $R^c$ groups may be the same or different. Furthermore, x represents an integer of 0 to 3, y represents an integer of 0 to 3, y' represents an integer of 0 to 2, and z represents an integer of 0 to 4, provided that x+y+z in formula (a1-2) is from 1 to 7 and x+y+y'+z in formula (a1-3) is from 1 to 7. When y+z or y+y'+z is an integer of 2 or greater, the plurality of $R^d$ groups may be the same or different. $X^{Ar}$ represents a monovalent organic group having an aromatic ring.

In the above formulas, examples of the alkyl group and the halogenated alkyl group for R include the same groups as the alkyl groups and halogenated alkyl groups mentioned above, within the description relating to the α-substituted styrene and the like, as the substituent which may be bonded to the carbon atom on the α-position. R is preferably a hydrogen atom, an alkyl group of 1 to 5 carbon atoms or a fluorinated alkyl group of 1 to 5 carbon atoms, and is most preferably a hydrogen atom or a methyl group.

In the above formulas, there are no particular limitations on the organic group for each of $X^c$ and $X^d$ provided the group contains a carbon atom, and the organic group may also contain atoms other than the carbon atom (such as a hydrogen atom, oxygen atom, nitrogen atom, sulfur atom, halogen atom (such as a fluorine atom or chlorine atom) or silicon atom).

The organic group for each of $X^c$ and $X^d$ is preferably a hydrocarbon group which may have a substituent, and is more preferably an alkyl group which may have a substituent.

Examples of the alkyl group which may have a substituent include unsubstituted alkyl groups, and substituted alkyl groups in which part or all of the hydrogen atoms of such an unsubstituted alkyl group have each been substituted with a substituent.

The unsubstituted alkyl group may be a linear, branched or cyclic group. From the viewpoint of achieving superior resolution, an alkyl group of 1 to 10 carbon atoms is preferable, and an alkyl group of 1 to 5 carbon atoms is more preferable. Specific examples include a methyl group, ethyl group, n-propyl group, isopropyl group, n-butyl group, isobutyl group, n-pentyl group, cyclopentyl group, hexyl group, cyclohexyl group, nonyl group and decyl group.

Examples of the substituent in the substituted alkyl group include an alkoxy group, a halogen atom, a halogenated alkyl group, a hydroxyl group, an oxo group (=O) and a cyano group.

The alkoxy group for the substituent is preferably an alkoxy group of 1 to 5 carbon atoms, is more preferably a methoxy group, ethoxy group, n-propoxy group, iso-propoxy group, n-butoxy group or tert-butoxy group, and is most preferably a methoxy group or an ethoxy group.

Examples of the halogen atom for the substituent include a fluorine atom, chlorine atom, bromine atom and iodine atom, and a fluorine atom is preferable.

Examples of the halogenated alkyl group for the substituent include groups in which part or all of the hydrogen atoms of an aforementioned alkyl group have each been substituted with an aforementioned halogen atom.

Further, a portion of the carbon atoms that constitute the unsubstituted or substituted alkyl group may be substituted with a hetero atom-containing substituent. This hetero atom-containing substituent is preferably —O—, —C(=O)—O—, —S—, —S(=O)$_2$—, —S(=O)$_2$—O—, or —Si—.

In the above formulas, examples of the halogen atom for each of $R^c$ and $R^d$ include a fluorine atom, chlorine atom, bromine atom and iodine atom, and a fluorine atom is preferable.

In the group —COOX$^e$ for $R^c$ or $R^d$, X$^e$ represents a hydrogen atom or an organic group, and examples of the organic group include the same organic groups as those mentioned above for $X^c$ and $X^d$.

Examples of the alkyl group of 1 to 5 carbon atoms and the halogenated alkyl group of 1 to 5 carbon atoms for $R^c$ and $R^d$ include the same groups as the alkyl groups of 1 to 5 carbon atoms and halogenated alkyl groups of 1 to 5 carbon atoms mentioned above for R.

$X^{Ar}$ is a monovalent organic group having an aromatic ring, and examples include groups in which one or more hydrogen atoms have been removed from one of the aromatic rings mentioned above. $X^{Ar}$ is preferably a group in which one hydrogen atom has been removed from a benzene, naphthalene or anthracene which may have a substituent.

The structural unit (a1) within the component (A) may be a single type of structural unit or a combination of two or more types of structural units.

The amount of the structural unit (a1) within the component (A), based on the combined total of all the structural units that constitute the component (A), is preferably within a range from 10 to 95 mol %, more preferably from 20 to 90 mol %, still more preferably from 30 to 90 mol %, and most preferably from 50 to 85 mol %.

When the amount of the structural unit (a1) is at least as large as the lower limit of the above range, a favorable phase separation of the upper layer containing the block copolymer can be achieved. Further, when the amount of the structural unit (a1) is not more than the upper limit of the above range, a good balance can be achieved with the structural unit (a2).

[Structural Unit (a2)]

The structural unit (a2) is a structural unit not having an aromatic ring. By including both the structural unit (a1) and the structural unit (a2), the component (A) is able to exhibit good affinity for each of the structural units within the block copolymer.

There are no particular limitations on the structural unit (a2), provided it does not have an aromatic ring described in relation to the structural unit (a1) within the structure of the structural unit, and examples include:

- a structural unit derived from an acrylic acid or an ester thereof in which the hydrogen atom bonded to the carbon atom on the α-position may be substituted with a substituent, and not having an aromatic ring,
- a structural unit derived from an acrylamide or a derivative thereof in which the hydrogen atom bonded to the carbon atom on the α-position may be substituted with a substituent, and not having an aromatic ring,
- a structural unit derived from a cycloolefin or a derivative thereof, and not having an aromatic ring, and
- a structural unit derived from a vinyl sulfonate ester and not having an aromatic ring.

Among these structural units, a structural unit derived from an acrylic acid or an ester thereof in which the hydrogen atom bonded to the carbon atom on the α-position may be substituted with a substituent, or a structural unit derived from an acrylamide or a derivative thereof in which the hydrogen atom bonded to the carbon atom on the α-position may be substituted with a substituent is preferable.

Examples of the "acrylamide or derivative thereof" include acrylamides in which the hydrogen atom bonded to the carbon atom on the α-position may be substituted with a substituent (hereafter also referred to as (α-substituted) acrylamides), and compounds in which one or both of the terminal hydrogen atoms of the amino group of an (α-substituted) acrylamide have each been substituted with a substituent.

Examples of the substituent which may be bonded to the carbon atom on the α-position in an acrylamide or a derivative thereof include the same groups as those mentioned above as the substituent bonded to the carbon atom on the α-position in an aforementioned α-substituted styrene.

The substituent that substitutes one or both of the terminal hydrogen atoms of the amino group of an (α-substituted) acrylamide is preferably an organic group. There are no particular limitations on this organic group, and examples include the same organic groups as those mentioned above for the organic group in the (α-substituted) acrylate ester.

Examples of compounds in which one or both of the terminal hydrogen atoms of the amino group of an (α-substituted) acrylamide have been substituted with a substituent include compounds in which the —C(=O)—O— group bonded to the α-position carbon atom in an aforementioned (α-substituted) acrylate ester has been substituted with —C(=O)—N($R^b$)— (wherein $R^b$ represents a hydrogen atom or an alkyl group of 1 to 5 carbon atoms).

In the above formula, the alkyl group for $R^b$ is preferably a linear or branched group.

As the structural unit (a2), a structural unit represented by formula (a2-1) or (a2-2) shown below is particularly desirable.

[Chemical Formula 2]

In the above formulas, R is the same as defined above, each of $X^a$ and $X^b$ independently represents a hydrogen atom or an organic group not having an aromatic ring, and $R^b$ represents a hydrogen atom or an alkyl group of 1 to 5 carbon atoms.

In the above formulas, each of $X^a$ and $X^b$ independently represents a hydrogen atom or an organic group. There are no particular limitations on the organic group, provided the group contains a carbon atom but does not have an aromatic ring, and the organic group may also contain atoms other than the carbon atom (such as a hydrogen atom, oxygen atom, nitrogen atom, sulfur atom, halogen atom (such as a fluorine atom or chlorine atom) or silicon atom). Specific examples of the organic group for $X^a$ or $X^b$ include the same groups as those described above for the organic group for $X^c$ or $X^d$.

In the above formulas, examples of the alkyl group of 1 to 5 carbon atoms for $R^b$ include the same groups as those mentioned above for the alkyl group of 1 to 5 carbon atoms for R.

The structural unit (a2) within the component (A) may be a single type of structural unit or a combination of two or more types of structural units.

The amount of the structural unit (a2) within the component (A), based on the combined total of all the structural units that constitute the component (A), is preferably within a range from 5 to 90 mol %, more preferably from 10 to 80 mol %, still more preferably from 10 to 70 mol %, and most preferably from 15 to 50 mol %.

When the amount of the structural unit (a2) is at least as large as the lower limit of the above range, a favorable phase separation of the upper layer containing the block copolymer can be achieved. Further, when the amount of the structural unit (a2) is not more than the upper limit of the above range, a good balance can be achieved with the structural unit (a1).

{Ether-Containing Cyclic Group}

The component (A) of the present invention has a 3 to 7-membered, ether-containing cyclic group. Here, an "ether-containing cyclic group" describes a cyclic group containing a structure in which a carbon atom within a cyclic hydrocarbon has been substituted with an oxygen atom (namely, a cyclic ether). Specifically, groups represented by formulas (e-1) and (e-2) shown below are preferable.

[Chemical Formula 3]

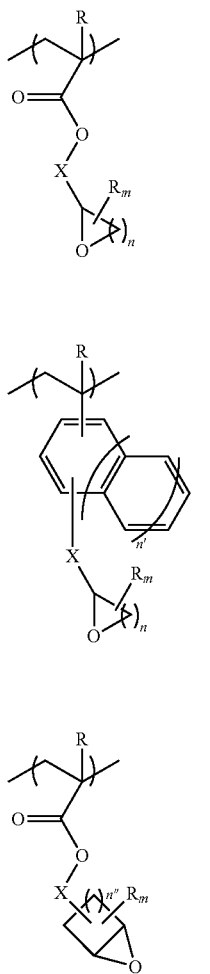

(e-1)

(e-2)

(e-3)

In the above formulas, R is the same as defined above, X represents a single bond or an alkylene group of 1 to 3 carbon atoms, n represents an integer of 1 to 5, $R_m$ represents a hydrogen atom or an alkyl group of 1 to 5 carbon atoms, n' represents an integer of 0 to 2, and n" represents an integer of 1 to 4.

Among the groups represented by the above formulas (e-1) to (e-3), specific examples of preferable groups include those shown below.

[Chemical Formula 4]

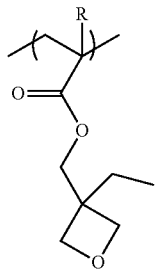

(e-1-1)

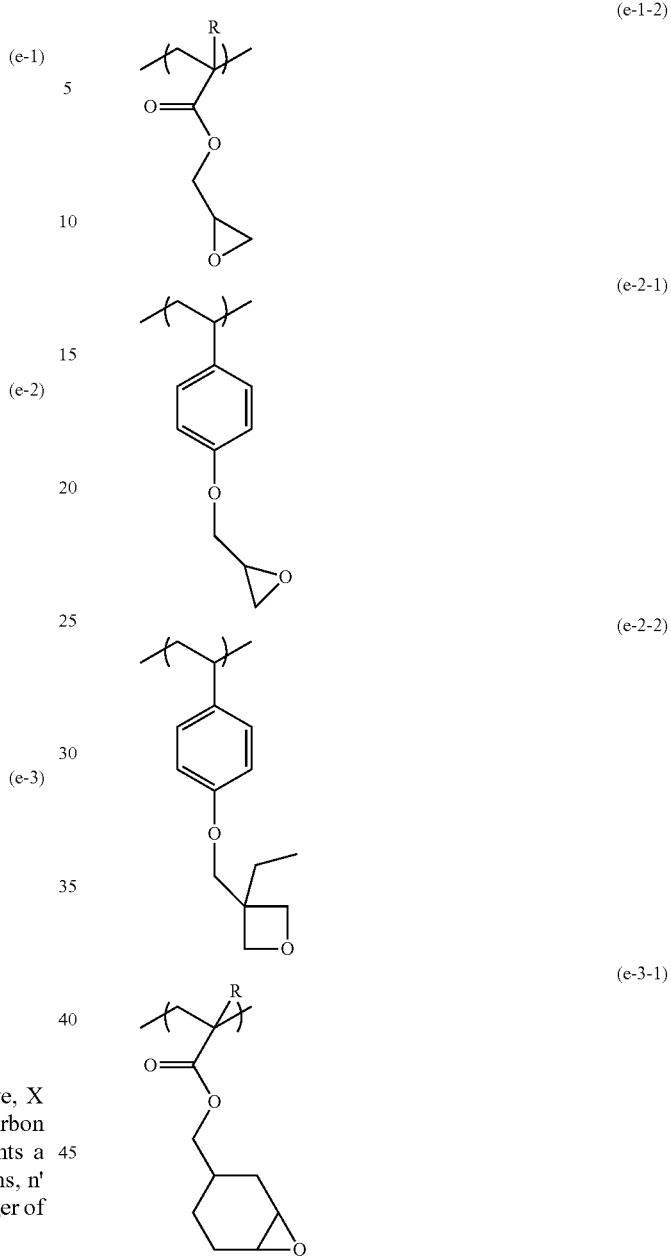

(e-1-2)

(e-2-1)

(e-2-2)

(e-3-1)

In the formulas, R is the same as defined above.

Because the component (A) of the present invention is formed from the structural unit (a1) and the structural unit (a2), each of these structural units may have a 3 to 7-membered, ether-containing cyclic group. For example, in those cases where the structural units (a1) and (a2) are represented by the aforementioned formulas (a1-1) to (a1-4) and (a2-1) and (a2-2), the organic groups for $X^a$ to $X^d$, $X^{Ar}$ and $R^b$ to $R^d$ within the formulas may include an ether-containing cyclic group.

{Substrate Interaction Group}

The component (A) of the present invention includes a substrate interaction group. By including the substrate interaction group within the component (A), the undercoat agent containing the component (A) and the substrate can interact, forming a strong film (a layer composed of the undercoat agent) on the substrate, and as a result, the layer containing the block copolymer can undergo favorable phase separation on top of the layer composed of the undercoat agent.

In the present invention, the "group that can interact with the substrate" or the "substrate interaction group" describes a group that can interact chemically or physically with the substrate, and this group can be selected appropriately in accordance with the type of substrate being used. Examples of the types of interaction between the substrate and the substrate interaction group include covalent bonding interactions, ionic bonding interactions, hydrogen bonding interactions, electrostatic interactions, hydrophobic interactions, and van der Waals force interactions.

Specific examples of the substrate interaction group include a carboxyl group, cyano group, amino group, trialkoxysilyl group, dialkoxysilyl group and monoalkoxysilyl group, and among these, a carboxyl group, cyano group, amino group or trialkoxysilyl group is preferable.

The alkoxy groups within the trialkoxysilyl group are preferably methoxy groups or ethoxy groups, and are most preferably methoxy groups.

As mentioned above, the substrate interaction group may be included within the structural unit (a1) or within the structural unit (a2). Of these possibilities, it is preferable that the structural unit (a2) contains the substrate interaction group. Hereafter a structural unit (a2) containing a substrate interaction group is referred to as the structural unit (a21).

As the structural unit (a21), structural units represented by general formulas (a21-1) and (a21-2) shown below are preferable.

[Chemical Formula 5]

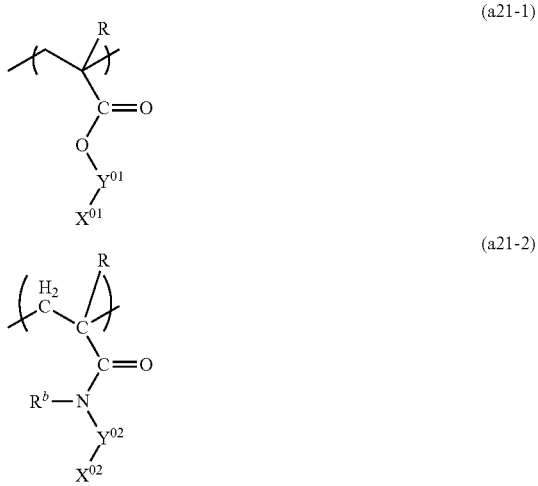

In the above formulas, R and $R^b$ are the same as defined above, $Y^{01}$ represents a single bond or a divalent linking group not having an aromatic ring, and $X^{01}$ represents a hydrogen atom, a carboxyl group, a cyano group, an amino group or a trialkoxysilyl group, provided that when $X^{01}$ represents a hydrogen atom, $Y^{01}$ represents a single bond, whereas when $X^{01}$ represents a carboxyl group, a cyano group, an amino group or a trialkoxysilyl group, $Y^{01}$ represents a divalent linking group not having an aromatic ring. $Y^{02}$ represents a divalent linking group not having an aromatic ring, and $X^{02}$ represents a carboxyl group, a cyano group, an amino group or a trialkoxysilyl group.

In the above formula, $Y^{01}$ represents a single bond or a divalent linking group not having an aromatic ring. There are no particular limitations on the divalent linking group for $Y^{01}$ provided it does not have an aromatic ring, but examples of preferable groups include divalent hydrocarbon groups which may have a substituent but do not have an aromatic ring, and divalent linking groups containing a hetero atom but not having an aromatic ring.

(Divalent Hydrocarbon Group which May have a Substituent)

The hydrocarbon group for the divalent linking group not having an aromatic ring is preferably an aliphatic hydrocarbon group.

An aliphatic hydrocarbon group refers to a hydrocarbon group that has no aromaticity. The aliphatic hydrocarbon group may be saturated or unsaturated, but in general, is preferably saturated.

More specific examples of the aliphatic hydrocarbon group include linear or branched aliphatic hydrocarbon groups, and aliphatic hydrocarbon groups that include a ring within the structure.

The linear or branched aliphatic hydrocarbon group preferably has 1 to 10 carbon atoms, more preferably 1 to 8 carbon atoms, and still more preferably 1 to 5 carbon atoms.

The linear aliphatic hydrocarbon group is preferably a linear alkylene group, and specific examples include a methylene group [—$CH_2$—], an ethylene group [—$(CH_2)_2$-], a trimethylene group [—$(CH_2)_3$-], a tetramethylene group [—$(CH_2)_4$—] and a pentamethylene group [—$(CH_2)_5$-].

The branched aliphatic hydrocarbon group is preferably a branched alkylene group, and specific examples include alkylalkylene groups, including alkylmethylene groups such as —CH($CH_3$)—, —CH($CH_2CH_3$)—, —C($CH_3$)$_2$—, —C($CH_3$)($CH_2CH_3$)—, —C($CH_3$)($CH_2CH_2CH_3$)— and —C($CH_2CH_3$)$_2$—, alkylethylene groups such as —CH($CH_3$)$CH_2$—, —CH($CH_3$)CH($CH_3$)—, —C($CH_3$)$_2$CH$_2$—, —CH($CH_2CH_3$)CH$_2$— and —C($CH_2CH_3$)$_2$—CH$_2$—, alkyltrimethylene groups such as —CH($CH_3$)CH$_2$CH$_2$— and —CH$_2$CH($CH_3$)CH$_2$—, and alkyltetramethylene groups such as —CH($CH_3$)CH$_2$CH$_2$CH$_2$— and —CH$_2$CH($CH_3$)CH$_2$CH$_2$—. The alkyl group within the alkylalkylene group is preferably a linear alkyl group of 1 to 5 carbon atoms.

The linear or branched aliphatic hydrocarbon group may or may not have a substituent (a group or atom other than a hydrogen atom) that substitutes a hydrogen atom. Examples of the substituent include a fluorine atom, a fluorinated alkyl group of 1 to 5 carbon atoms, and an oxo group (═O).

Examples of the aliphatic hydrocarbon group that includes a ring within the structure include cyclic aliphatic hydrocarbon groups (groups in which two hydrogen atoms have been removed from an aliphatic hydrocarbon ring) which may contain a hetero atom-containing substituent within the cyclic structure, groups in which an aforementioned cyclic aliphatic hydrocarbon group is bonded to the terminal of a linear or branched aliphatic hydrocarbon group, and groups in which an aforementioned cyclic aliphatic hydrocarbon group is interposed within the chain of a linear or branched aliphatic hydrocarbon group. Examples of the linear or branched aliphatic hydrocarbon group include the same groups as those mentioned above.

The cyclic aliphatic hydrocarbon group preferably contains 3 to 20 carbon atoms, and more preferably 3 to 12 carbon atoms.

The cyclic aliphatic hydrocarbon group may be either a polycyclic group or a monocyclic group. The monocyclic aliphatic hydrocarbon group is preferably a group in which two hydrogen atoms have been removed from a monocycloalkane. The monocycloalkane preferably contains 3 to 6 carbon atoms, and specific examples include cyclopentane and cyclohexane. The polycyclic aliphatic hydrocarbon group is preferably a group in which two hydrogen atoms have been removed from a polycycloalkane, and the polycycloalkane preferably has 7 to 12 carbon atoms. Specific examples of the polycycloalkane include adamantane, norbornane, isobornane, tricyclodecane and tetracyclododecane.

The cyclic aliphatic hydrocarbon group may or may not have a substituent (a group or atom other than a hydrogen atom) that substitutes a hydrogen atom. Examples of the substituent include an alkyl group, alkoxy group, halogen atom, halogenated alkyl group, hydroxyl group and oxo group (=O).

The alkyl group for the substituent is preferably an alkyl group of 1 to 5 carbon atoms, and is most preferably a methyl group, ethyl group, propyl group, n-butyl group or tert-butyl group.

The alkoxy group for the substituent is preferably an alkoxy group of 1 to 5 carbon atoms, is more preferably a methoxy group, ethoxy group, n-propoxy group, iso-propoxy group, n-butoxy group or tert-butoxy group, and is most preferably a methoxy group or an ethoxy group.

Examples of the halogen atom for the substituent include a fluorine atom, chlorine atom, bromine atom and iodine atom, and a fluorine atom is preferred.

Examples of the halogenated alkyl group for the substituent include groups in which part or all of the hydrogen atoms of an aforementioned alkyl group have each been substituted with an aforementioned halogen atom.

In the cyclic aliphatic hydrocarbon group, a portion of the carbon atoms that constitute the ring structure may be substituted with a hetero atom-containing substituent. This hetero atom-containing substituent is preferably —O—, —C(=O)—O—, —S—, —S(=O)$_2$—, or —S(=O)$_2$—O—.

(Divalent Linking Group Containing a Hetero Atom)

Examples of the hetero atom in the "divalent linking group containing a hetero atom" for $Y^{01}$ include atoms other than a carbon atom or hydrogen atom, and specific examples include an oxygen atom, nitrogen atom, sulfur atom and halogen atom.

Examples of the divalent linking group containing a hetero atom include —O—, —C(=O)—O—, —C(=O)—, —O—C(=O)—O—, —C(=O)—NH—, —NH— (wherein H may be substituted with a substituent such as an alkyl group or an acyl group or the like), —S—, —S(=O)$_2$—, —S(=O)$_2$—O—, —NH—C(=O)—, =N—, and groups represented by one of the general formulas —$Y^{21}$—O—$Y^{22}$—, —[$Y^{21}$—C(=O)—O]$_{m'}$—$Y^{22}$—, —C(=O)—O—$Y^{22}$— and —$Y^{21}$—O—C(=O)—$Y^{22}$— [in these formulas, each of $Y^{21}$ and $Y^{22}$ independently represents a divalent hydrocarbon group which may have a substituent, O represents an oxygen atom, and m' represents an integer of 0 to 3].

When $Y^{01}$ represents —NH—, this H may be substituted with a substituent such as an alkyl group or an acyl group. The substituent (such as the alkyl group or aryl group) preferably contains 1 to 10 carbon atoms, more preferably 1 to 8 carbon atoms, and most preferably 1 to 5 carbon atoms.

Each of $Y^{21}$ and $Y^{22}$ independently represents a divalent hydrocarbon group which may have a substituent. Examples of the divalent hydrocarbon groups include the same groups as those mentioned above within the description of the "divalent hydrocarbon group which may have a substituent" for $Y^{01}$.

$Y^{21}$ is preferably a linear aliphatic hydrocarbon group, more preferably a linear alkylene group, still more preferably a linear alkylene group of 1 to 5 carbon atoms, and most preferably a methylene group or an ethylene group.

$Y^{22}$ is preferably a linear or branched aliphatic hydrocarbon group, and is more preferably a methylene group, an ethylene group or an alkylmethylene group. The alkyl group within the alkylmethylene group is preferably a linear alkyl group of 1 to 5 carbon atoms, more preferably a linear alkyl group of 1 to 3 carbon atoms, and most preferably a methyl group.

In the group represented by the formula —[$Y^{21}$—C(=O)—O]$_{m'}$—$Y^{22}$— represents an integer of 0 to 3, and is preferably an integer of 0 to 2, more preferably 0 or 1, and most preferably 1. In other words, the group represented by formula —[$Y^{21}$—C(=O)—O]$_{m'}$—$Y^{22}$— is most preferably a group represented by a formula —$Y^{21}$—C(=O)—O—$Y^{22}$—. Among such groups, groups represented by a formula —(CH$_2$)$_{a'}$—C(=O)—O—(CH$_2$)$_{b'}$— are particularly preferred. In this formula, a' is an integer of 1 to 10, preferably an integer of 1 to 8, more preferably an integer of 1 to 5, still more preferably 1 or 2, and most preferably 1. Further, b' is an integer of 1 to 10, preferably an integer of 1 to 8, more preferably an integer of 1 to 5, still more preferably 1 or 2, and most preferably 1.

The divalent linking group containing a hetero atom is preferably a linear group containing an oxygen atom as the hetero atom, such as a group containing an ether linkage or an ester linkage, and a group represented by one of the above formulas —$Y^{21}$—O—$Y^{22}$—, —[$Y^{21}$—C(=O)—O]$_{m'}$—$Y^{22}$— or —$Y^{21}$—O—C(=O)—$Y^{22}$— is particularly desirable.

Of the various possibilities described above, the divalent linking group for $Y^{01}$ is preferably a linear or branched alkylene group, a divalent alicyclic hydrocarbon group or a divalent linking group containing a hetero atom. Among these groups, a linear or branched alkylene group, or a divalent linking group containing an ester linkage (—C(=O)—O—) is particularly preferable.

In the above formula, $X^{01}$ represents a hydrogen atom, a carboxyl group, a cyano group, an amino group or a trialkoxysilyl group, wherein the alkoxy group within the trialkoxysilyl group is the same as described above, and the trialkoxysilyl group is most preferably a trimethoxysilyl group.

In the above formula, $Y^{02}$ represents a divalent linking group not having an aromatic ring, and is the same as defined above for the divalent linking group not having an aromatic ring described for $Y^{01}$.

The trialkoxysilyl group for $X^{02}$ is the same as defined above for the trialkoxysilyl group for $X^{01}$.

Specific examples of the structural unit (a21) are shown below. In the following formulas, R is the same as defined above.

[Chemical Formula 6]

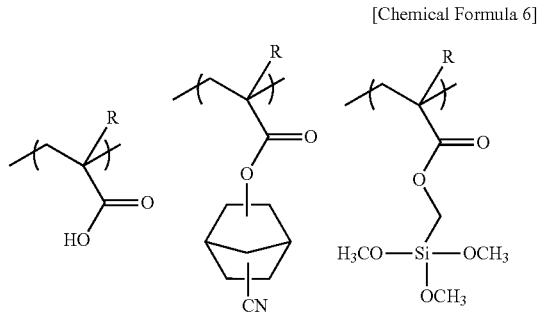

-continued

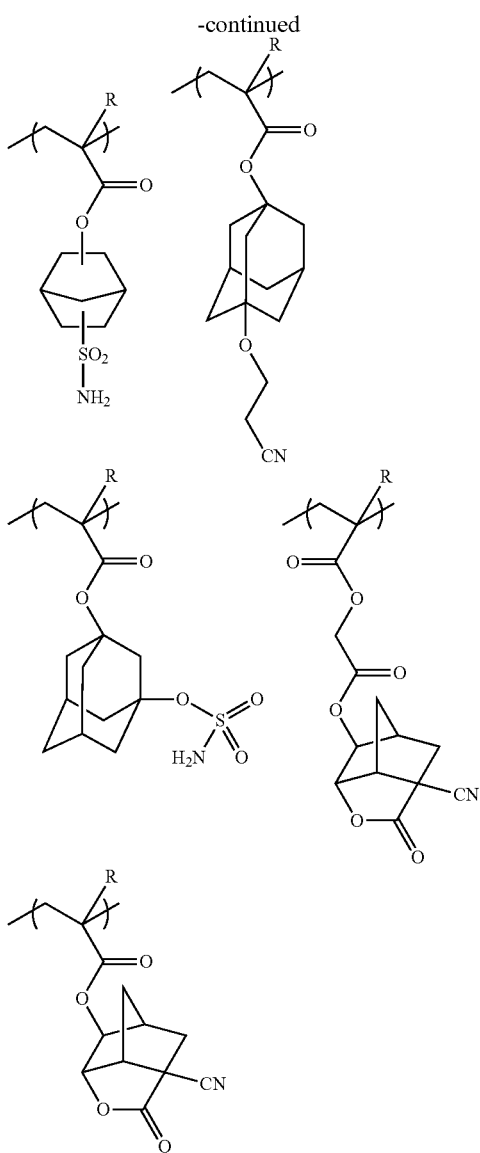

The structural unit (a21) may be a single type of structural unit or a combination of two or more types of structural units.

The proportion of the structural unit (a21) within the structural unit (a2) is preferably within a range from 5 to 100 mol %, and more preferably from 10 to 100 mol %. In other words, the structural unit (a2) may be composed only of the structural unit (a21).

The weight-average molecular weight (Mw) (the polystyrene equivalent value determined by gel permeation chromatography (GPC)) of the component (A) is not particularly limited, but is preferably within a range from 1,000 to 200,000, more preferably from 1,500 to 200,000, and most preferably from 2,000 to 150,000. When the weight-average molecular weight is not more than the upper limit of the above range, the component (A) exhibits satisfactory solubility in the types of organic solvents described below, and therefore applicability of the component (A) to a substrate is excellent. On the other hand, when the weight-average molecular weight is at least as large as the lower limit of the above range, the production stability of the polymer is excellent, and a composition having excellent applicability to a substrate is obtained.

Further, although there are no particular limitations on the dispersity (Mw/Mn) of the component (A), the dispersity is preferably within a range from 1.0 to 5.0, more preferably from 1.0 to 3.0, and most preferably from 1.0 to 2.5. Here, Mn represents the number-average molecular weight.

The component (A) can be produced, for example, by a conventional radical polymerization or the like of the monomers corresponding with each of the structural units, using a radical polymerization initiator such as azobisisobutyronitrile (AIBN).

Furthermore, by using a chain transfer agent such as HS—$CH_2$—$CH_2$—$CH_2$—$C(CF_3)_2$—OH during the aforementioned polymerization, a —$C(CF_3)_2$—OH group can be introduced at the terminals of the component (A).

The monomers used for forming each of the structural units may be commercially available compounds, or may be synthesized using conventional methods.

In the undercoat agent of the present invention, a single type of the component (A) may be used alone, or a combination of two or more types of the component (A) may be used.

In the undercoat agent of the present invention, the amount of the component (A) may be adjusted appropriately in accordance with the thickness required for the layer composed of the undercoat agent.

[Acid Generator Component; Component (B)]

The undercoat agent of the present invention may also include an acid generator component (B) (hereafter also referred to as "component (B)"). The component (B) is a material that generates acid upon heating or exposure to radiation. The component (B) itself need not necessarily exhibit acidity, provided that it decomposes under the action of heat or light to form a material that functions as an acid.

There are no particular limitations on the component (B), and any of the conventional materials that have already been proposed as acid generators for use in chemically amplified resists can be used.

Examples of these acid generators include thermal acid generators that generate acid upon heating, and photo-acid generators that generate acid upon exposure to radiation. Specific examples are numerous, and include onium salt-based acid generators such as iodonium salts and sulfonium salts, oxime sulfonate-based acid generators, diazomethane-based acid generators such as bisalkyl or bisaryl sulfonyl diazomethanes and poly(bis-sulfonyl)diazomethanes, nitrobenzylsulfonate-based acid generators, iminosulfonate-based acid generators, and disulfone-based acid generators.

These acid generator components are typically known as photo-acid generators (PAG), but also function as thermal acid generators (TAG). Accordingly, any of the conventional materials known as acid generators for use with chemically amplified resist compositions can be used as the acid generator component used in the present invention.

A "thermal acid generator that generates acid upon heating" describes a component that generates acid upon heating, preferably at a temperature of not more than 200° C., and more preferably at a temperature within a range from 50 to 150° C. Ensuring that the heating temperature is not more than 200° C. enables easier control of the acid generation. Further, ensuring that the heating temperature is at least 50° C. enables the acid generator to maintain favorable stability within the undercoat agent.

In an onium salt-based acid generator of the component (B), the anion moiety is preferably at least one anion selected from the group consisting of sulfonate anions, carboxylate anions, sulfonylimide anions, bis(alkylsulfonyl)imide anions, tris(alkylsulfonyl)methide anions and fluorinated antimonate anions.

Further, examples of the cation moiety include cations represented by general formula (b-c1) or (b-c2) shown below.

[Chemical Formula 7]

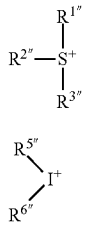

In the above formulas, each of $R^{1\prime\prime}$ to $R^{3\prime\prime}$, $R^{5\prime\prime}$ and $R^{6\prime\prime}$ independently represents an aryl group, alkyl group or alkenyl group which may have a substituent, and two of $R^{1\prime\prime}$ to $R^{3\prime\prime}$ in formula (b-c1) may be bonded to each other to form a ring in combination with the sulfur atom in the formula.

In formula (b-c1), each of $R^{1\prime\prime}$ to $R^{3\prime\prime}$ independently represents an aryl group, alkyl group or alkenyl group which may have a substituent. Two of $R^{1\prime\prime}$ to $R^{3\prime\prime}$ may be bonded to each other to form a ring together with the sulfur atom in the formula.

Examples of the aryl group for $R^{1\prime\prime}$ to $R^{3\prime\prime}$ include an unsubstituted aryl group having 6 to 20 carbon atoms, and a substituted aryl group in which a part or all of the hydrogen atoms of an aforementioned unsubstituted aryl group have each been substituted with an alkyl group, alkoxy group, halogen atom, hydroxyl group, oxo group (=O), aryl group, alkoxyalkyloxy group, alkoxycarbonylalkyloxy group, —C(=O)—O—$R^{6\prime}$, —O—C(=O)—$R^{7\prime}$, or —O—$R^{8\prime}$ or the like. Each of $R^{6\prime}$, $R^{7\prime}$ and $R^{8\prime}$ represents a linear or branched saturated hydrocarbon group of 1 to 25 carbon atoms, a cyclic saturated hydrocarbon group of 3 to 20 carbon atoms, or a linear or branched, aliphatic unsaturated hydrocarbon group of 2 to 5 carbon atoms.

The unsubstituted aryl group for $R^{1\prime\prime}$ to $R^{3\prime\prime}$ is preferably an aryl group of 6 to 10 carbon atoms because such groups enable lower cost synthesis. Specific examples of such groups include a phenyl group and a naphthyl group.

The alkyl group as the substituent for the substituted aryl group represented by $R^{1\prime\prime}$ to $R^{3\prime\prime}$ is preferably an alkyl group of 1 to 5 carbon atoms, and a methyl group, ethyl group, propyl group, n-butyl group or tert-butyl group is particularly desirable.

The alkoxy group as the substituent for the substituted aryl group is preferably an alkoxy group having 1 to 5 carbon atoms, and a methoxy group, ethoxy group, n-propoxy group, iso-propoxy group, n-butoxy group or tert-butoxy group is particularly desirable.

The halogen atom as the substituent for the substituted aryl group is preferably a fluorine atom.

Examples of the aryl group as the substituent for the substituted aryl group include the same aryl groups as those described above for $R^{1\prime\prime}$ to $R^{3\prime\prime}$.

Examples of the alkoxyalkyloxy group as the substituent for the substituted aryl group include groups represented by a general formula shown below.

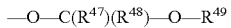

In this formula, each of $R^{47}$ and $R^{48}$ independently represents a hydrogen atom or a linear or branched alkyl group, and $R^{49}$ represents an alkyl group.

The alkyl group for $R^{47}$ and $R^{48}$ preferably has 1 to 5 carbon atoms, and may be either linear or branched, but is preferably an ethyl group or a methyl group, and most preferably a methyl group.

It is preferable that at least one of $R^{47}$ and $R^{48}$ is a hydrogen atom. It is particularly desirable that at least one of $R^{47}$ and $R^{48}$ is a hydrogen atom, and the other is a hydrogen atom or a methyl group.

The alkyl group for $R^{49}$ preferably has 1 to 15 carbon atoms, and may be linear, branched or cyclic.

The linear or branched alkyl group for $R^{49}$ preferably has 1 to 5 carbon atoms, and specific examples include a methyl group, ethyl group, propyl group, n-butyl group and tert-butyl group.

The cyclic alkyl group for $R^{49}$ preferably has 4 to 15 carbon atoms, more preferably 4 to 12 carbon atoms, and most preferably 5 to 10 carbon atoms. Specific examples include groups in which one or more hydrogen atoms have been removed from a monocycloalkane or a polycycloalkane such as a bicycloalkane, tricycloalkane or tetracycloalkane, which may or may not be substituted with an alkyl group of 1 to 5 carbon atoms, a fluorine atom or a fluorinated alkyl group. Examples of the monocycloalkane include cyclopentane and cyclohexane. Examples of the polycycloalkane include adamantane, norbornane, isobornane, tricyclodecane and tetracyclododecane. Among these possibilities, a group in which one or more hydrogen atoms have been removed from adamantane is preferable.

Examples of the alkoxycarbonylalkyloxy group as the substituent for the substituted aryl group include groups represented by a general formula shown below.

—O—$R^{50}$—C(=O)—O—$R^{56}$

In this formula, $R^{50}$ represents a linear or branched alkylene group, and $R^{56}$ represents a tertiary alkyl group.

The linear or branched alkylene group for $R^{50}$ preferably has 1 to 5 carbon atoms, and examples include a methylene group, ethylene group, trimethylene group, tetramethylene group and 1,1-dimethylethylene group.

Examples of the tertiary alkyl group for $R^{56}$ include 2-methyl-2-adamantyl group, 2-ethyl-2-adamantyl group, 1-methyl-1-cyclopentyl group, 1-ethyl-1-cyclopentyl group, 1-methyl-1-cyclohexyl group, 1-ethyl-1-cyclohexyl group, 1-(1-adamantyl)-1-methylethyl group, 1-(1-adamantyl)-1-methylpropyl group, 1-(1-adamantyl)-1-methylbutyl group, 1-(1-adamantyl)-1-methylpentyl group, 1-(1-cyclopentyl)-1-methylethyl group, 1-(1-cyclopentyl)-1-methylpropyl group, 1-(1-cyclopentyl)-1-methylbutyl group, 1-(1-cyclopentyl)-1-methylpentyl group, 1-(1-cyclohexyl)-1-methylethyl group, 1-(1-cyclohexyl)-1-methylpropyl group, 1-(1-cyclohexyl)-1-methylbutyl group, 1-(1-cyclohexyl)-1-methylpentyl group, tert-butyl group, tert-pentyl group and tert-hexyl group.

Further, a group in which $R^{56}$ in the group represented by the aforementioned general formula:  O—$R^{56}$ has been substituted with $R^{56\prime}$ can also be used. $R^{56\prime}$ represents a hydrogen atom, an alkyl group, a fluorinated alkyl group or an aliphatic cyclic group which may contain a hetero atom.

Examples of the alkyl group for $R^{56\prime}$ include the same groups as those described above for the alkyl group for $R^{49}$.

Examples of the fluorinated alkyl group for $R^{56\prime}$ include groups in which part or all of the hydrogen atoms within an aforementioned alkyl group for $R^{49}$ have each been substituted with a fluorine atom.

Examples of the aliphatic cyclic group which may contain a hetero atom for $R^{56\prime}$ include aliphatic cyclic groups that do not contain a hetero atom, aliphatic cyclic groups containing a hetero atom within the ring structure, and groups in which a hydrogen atom within an aliphatic cyclic group has been substituted with a hetero atom.

For $R^{56'}$, examples of the aliphatic cyclic groups that do not contain a hetero atom include groups in which one or more hydrogen atoms have been removed from a monocycloalkane or a polycycloalkane such as a bicycloalkane, tricycloalkane or tetracycloalkane. Examples of the monocycloalkane include cyclopentane and cyclohexane. Examples of the polycycloalkane include adamantane, norbornane, isobornane, tricyclodecane and tetracyclododecane. Among these, a group in which one or more hydrogen atoms have been removed from adamantane is preferable.

Specific examples of the aliphatic cyclic group for $R^{56'}$ containing a hetero atom in the ring structure include groups represented by formulas (L1) to (L6) and (S1) to (S4) shown below.

For $R^{56'}$, specific examples of the groups in which a hydrogen atom within the aliphatic cyclic group has been substituted with a hetero atom include groups in which two hydrogen atoms within an aliphatic cyclic group have been substituted with an oxygen atom (=O).

[Chemical Formula 8]

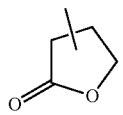
(L1)

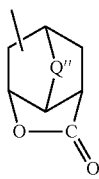
(L2)

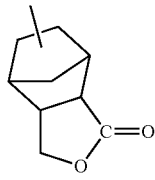
(L3)

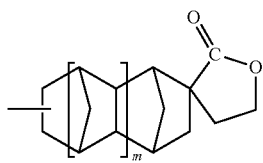
(L4)

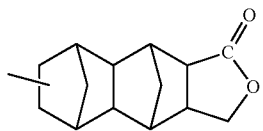
(L5)

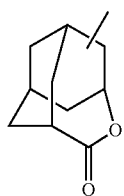
(L6)

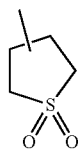
(S1)

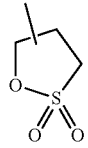
(S2)

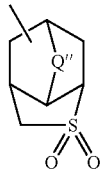
(S3)

(S4)

In the above formulas, Q" represents an alkylene group of 1 to 5 carbon atoms, —O—, —S—, —O—$R^{94}$— or —S—$R^{95}$—, wherein each of $R^{94}$ and $R^{95}$ independently represents an alkylene group of 1 to 5 carbon atoms, and m represents an integer of 0 or 1.

Each of $R^{6'}$, $R^{7'}$ and $R^{8'}$ in —C(=O)—O—$R^{6'}$, —O—C(=O)—$R^{7'}$ and —O—$R^{8'}$ represents a linear or branched saturated hydrocarbon group of 1 to 25 carbon atoms, a cyclic saturated hydrocarbon group of 3 to 20 carbon atoms, or a linear or branched, aliphatic unsaturated hydrocarbon group of 2 to 5 carbon atoms.

The linear or branched saturated hydrocarbon group has 1 to 25 carbon atoms, preferably 1 to 15 carbon atoms, and more preferably 4 to 10 carbon atoms.

Examples of the linear saturated hydrocarbon group include a methyl group, ethyl group, propyl group, butyl group, pentyl group, hexyl group, heptyl group, octyl group, nonyl group and decyl group.

Examples of the branched saturated hydrocarbon group, excluding tertiary alkyl groups, include a 1-methylethyl group, 1-methylpropyl group, 2-methylpropyl group, 1-methylbutyl group, 2-methylbutyl group, 3-methylbutyl group, 1-ethylbutyl group, 2-ethylbutyl group, 1-methylpentyl group, 2-methylpentyl group, 3-methylpentyl group and 4-methylpentyl group.

The linear or branched saturated hydrocarbon group may have a substituent. Examples of the substituent include an alkoxy group, halogen atom, halogenated alkyl group, hydroxyl group, oxygen atom (=O), cyano group and carboxyl group.

The alkoxy group as the substituent for the linear or branched saturated hydrocarbon group is preferably an alkoxy group having 1 to 5 carbon atoms, more preferably a methoxy group, ethoxy group, n-propoxy group, iso-propoxy group, n-butoxy group or tert-butoxy group, and most preferably a methoxy group or an ethoxy group.

Examples of the halogen atom as the substituent for the linear or branched, saturated hydrocarbon group include a fluorine atom, chlorine atom, bromine atom and iodine atom, and a fluorine atom is preferable.

Examples of the halogenated alkyl group as the substituent for the linear or branched saturated hydrocarbon group include groups in which part or all of the hydrogen atoms within an aforementioned linear or branched saturated hydrocarbon group have each been substituted with an aforementioned halogen atom.

The cyclic saturated hydrocarbon group of 3 to 20 carbon atoms for $R^{6\prime}$, $R^{7\prime}$ and $R^{8\prime}$ may be either a polycyclic group or a monocyclic group, and examples include groups in which one hydrogen atom has been removed from a monocycloalkane, and groups in which one hydrogen atom has been removed from a polycycloalkane such as a bicycloalkane, tricycloalkane or tetracycloalkane. More specific examples include groups in which one hydrogen atom has been removed from a monocycloalkane such as cyclopentane, cyclohexane, cycloheptane or cyclooctane, and groups in which one hydrogen atom has been removed from a polycycloalkane such as adamantane, norbornane, isobornane, tricyclodecane or tetracyclododecane.

The cyclic saturated hydrocarbon group may have a substituent. For example, a portion of the carbon atoms that constitute the ring within the cyclic alkyl group may be substituted with a hetero atom, or a hydrogen atom bonded to the ring within the cyclic alkyl group may be substituted with a substituent.

Examples of the former case include groups in which one or more hydrogen atoms have been removed from a heterocycloalkane in which a portion of the carbon atoms that constitute the ring(s) of an aforementioned monocycloalkane or polycycloalkane have been substituted with a hetero atom such as an oxygen atom, sulfur atom or nitrogen atom. Further, the ring structure may contain an ester linkage (—C(=O)—O—). More specific examples include a lactone-containing monocyclic group such as a group in which one hydrogen atom has been removed from γ-butyrolactone, and a lactone-containing polycyclic group such as a group in which one hydrogen atom has been removed from a bicycloalkane, tricycloalkane or tetracycloalkane containing a lactone ring.

In the latter case, examples of the substituent include the same substituents as those described above for the linear or branched alkyl group, and a lower alkyl group.

Alternatively, $R^{6\prime}$, $R^{7\prime}$ and $R^{8\prime}$ may be a combination of a linear or branched alkyl group and a cyclic alkyl group.

Examples of the combination of a linear or branched alkyl group with a cyclic alkyl group include groups in which a cyclic alkyl group is bonded as a substituent to a linear or branched alkyl group, and groups in which a linear or branched alkyl group is bonded as a substituent to a cyclic alkyl group.

Examples of the linear aliphatic unsaturated hydrocarbon group for $R^{6\prime}$, $R^{7\prime}$ and $R^{8\prime}$ include a vinyl group, a propenyl group (an allyl group) and a butynyl group.

Examples of the branched aliphatic unsaturated hydrocarbon group for $R^{6\prime}$, $R^{7\prime}$ and $R^{8\prime}$ include a 1-methylpropenyl group and a 2-methylpropenyl group.

The aforementioned linear or branched, aliphatic unsaturated hydrocarbon group may have a substituent. Examples of the substituent include the same substituents as those which the aforementioned linear or branched alkyl group may have.

Of the various possibilities described above, each of $R^{7\prime}$ and $R^{8\prime}$ is preferably a linear or branched saturated hydrocarbon group of 1 to 15 carbon atoms or a cyclic saturated hydrocarbon group of 3 to 20 carbon atoms, as such groups yield superior lithography properties and a more favorable resist pattern shape.

Examples of the alkyl group for $R^{1\prime\prime\prime}$ to $R^{3\prime\prime\prime}$ include linear, branched and cyclic alkyl groups of 1 to 10 carbon atoms. Of these, in terms of achieving excellent resolution, an alkyl group of 1 to 5 carbon atoms is preferred. Specific examples of the alkyl group include a methyl group, ethyl group, n-propyl group, isopropyl group, n-butyl group, isobutyl group, n-pentyl group, cyclopentyl group, hexyl group, cyclohexyl group, nonyl group and decyl group. A methyl group is the most desirable because it yields excellent resolution and enables synthesis to be performed at low cost.

In the alkyl group for $R^{1\prime\prime\prime}$ to $R^{3\prime\prime\prime}$, part or all of the hydrogen atoms of the alkyl group may be substituted with an alkoxy group, halogen atom, hydroxyl group, oxo group (=O), aryl group, alkoxyalkyloxy group, alkoxycarbonylalkyloxy group, —C(=O)—O—$R^{6\prime}$, —O—C(=O)—$R^{7\prime}$ or or the like. Examples of the alkoxy group, halogen atom, aryl group, alkoxyalkyloxy group, alkoxycarbonylalkyloxy group, —C(=O)—O—$R^{6\prime}$, —O—C(=O)—$R^{7\prime}$ and include the same atoms and groups as those mentioned above for the substituent for the aryl group represented by $R^{1\prime\prime\prime}$ to $R^{3\prime\prime\prime}$.

The alkenyl group for $R^{1\prime\prime\prime}$ to $R^{3\prime\prime\prime}$ preferably has 2 to 10 carbon atoms, more preferably 2 to 5 carbon atoms, and still more preferably 2 to 4 carbon atoms. Specific examples of the alkenyl group include a vinyl group, a propenyl group (allyl group), a butynyl group, a 1-methylpropenyl group and a 2-methylpropenyl group.

When two of $R^{1\prime\prime\prime}$ to $R^{3\prime\prime\prime}$ are bonded to each other to form a ring in combination with the sulfur atom shown in the formula, it is preferable that the two of $R^{1\prime\prime\prime}$ to $R^{3\prime\prime\prime}$ form a 3 to 10-membered ring including the sulfur atom, and it is particularly desirable that the two of $R^{1\prime\prime\prime}$ to $R^{3\prime\prime\prime}$ form a 5- to 7-membered ring including the sulfur atom.

Specific examples of preferred cation moieties represented by the aforementioned formula (b-c1) include the cations shown below.

[Chemical Formula 9]

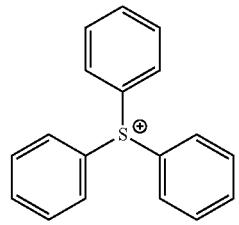

(ca-1-1)

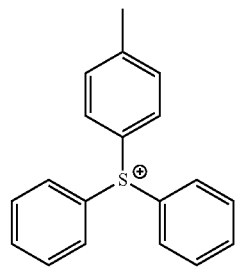

(ca-1-2)

(ca-1-3)
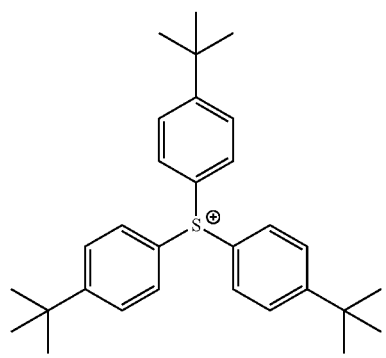
(ca-1-4)
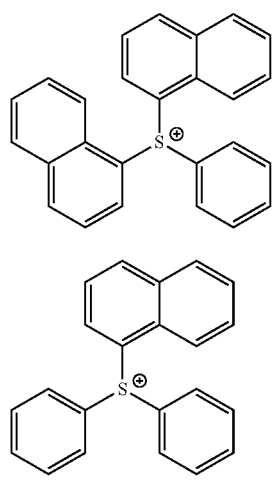
(ca-1-5)
(ca-1-6)
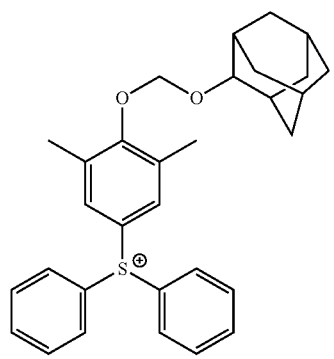
(ca-1-7)
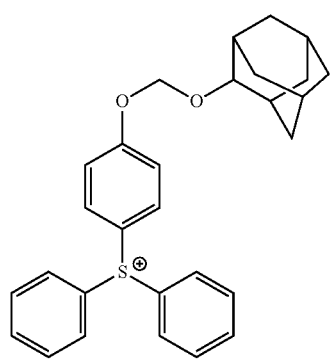
(ca-1-8)
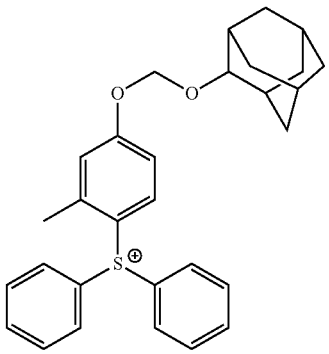
(ca-1-9)
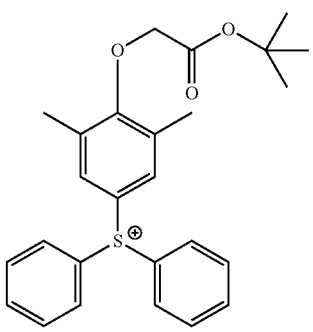
(ca-1-10)
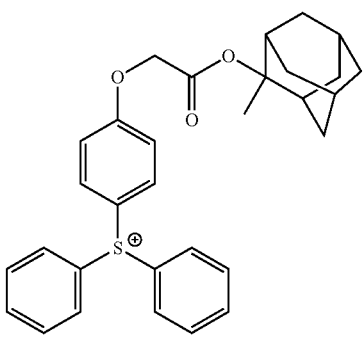
(ca-1-11)
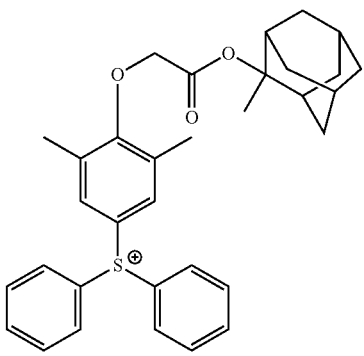

(ca-1-12)
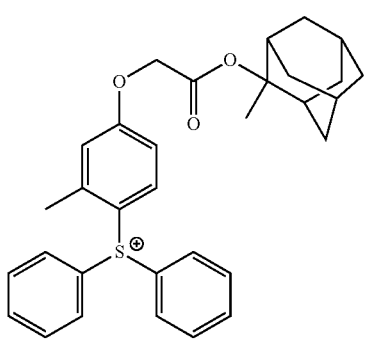
(ca-1-13)
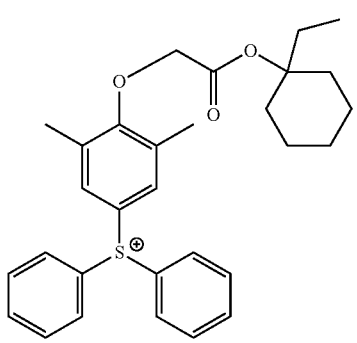
(ca-1-14)
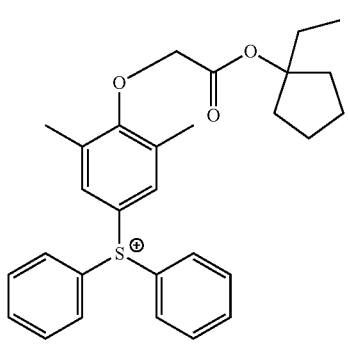
(ca-1-15)
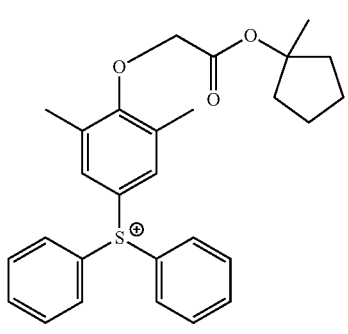
(ca-1-16)
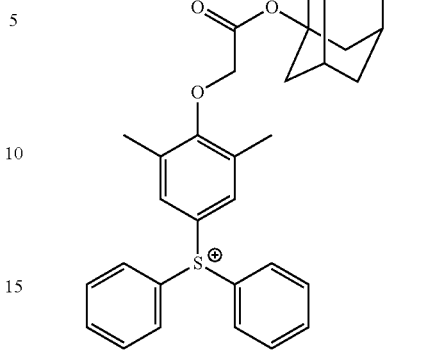
(ca-1-17)
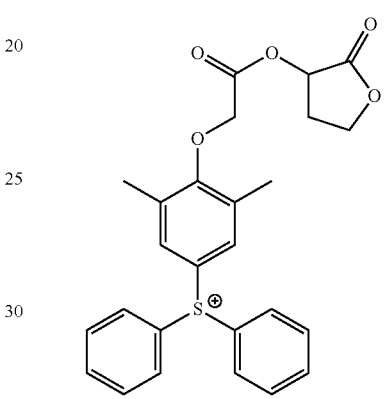
(ca-1-18)
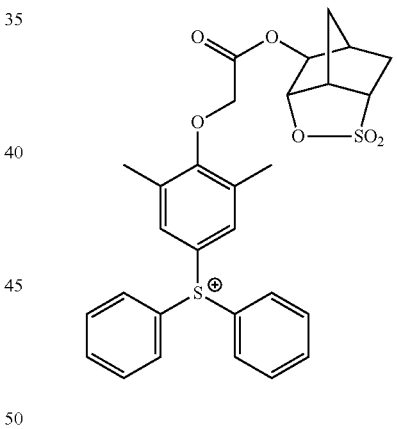
(ca-1-19)
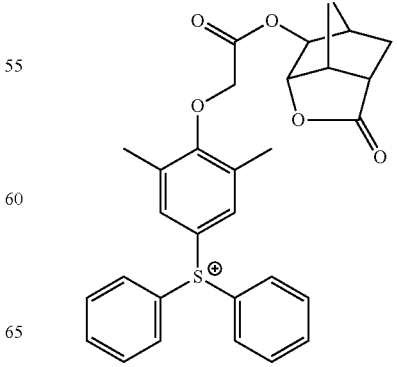

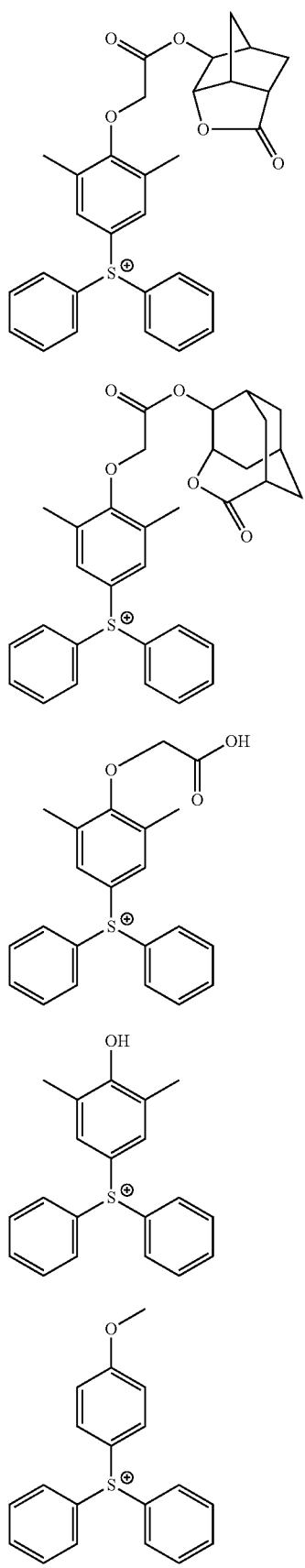
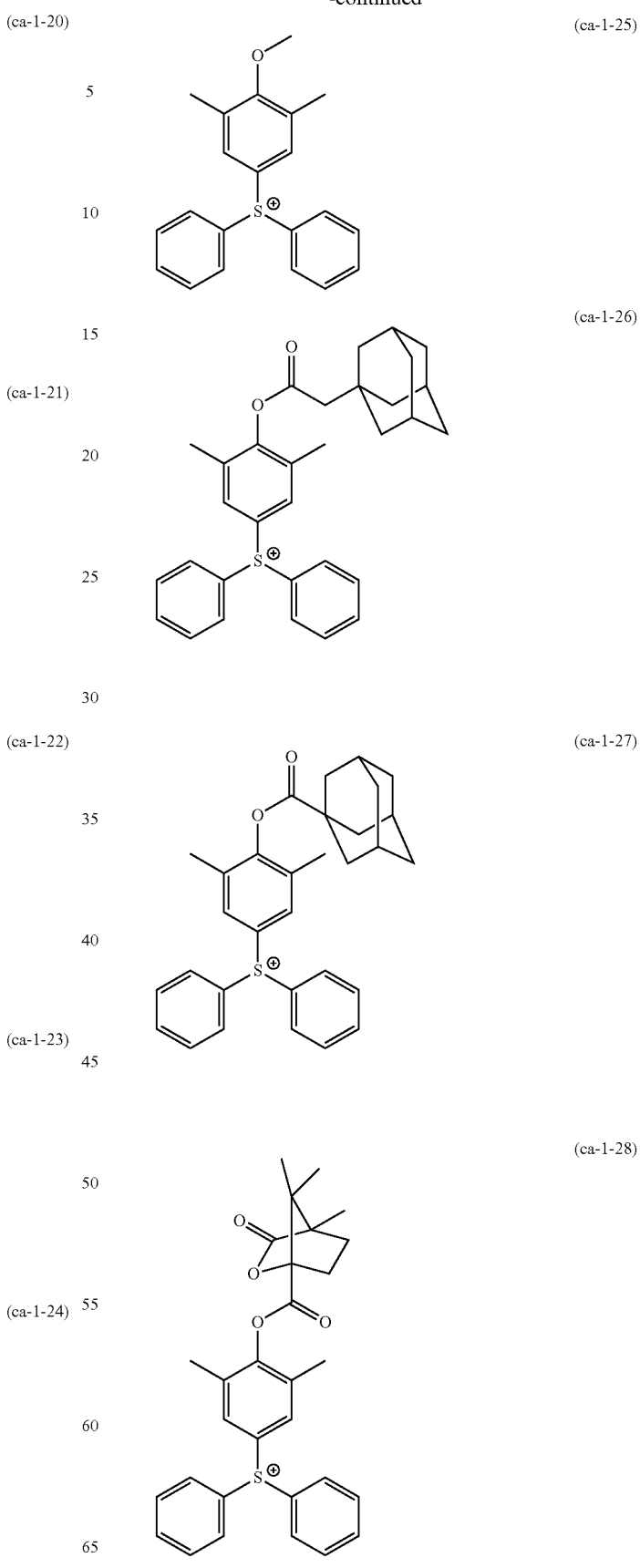

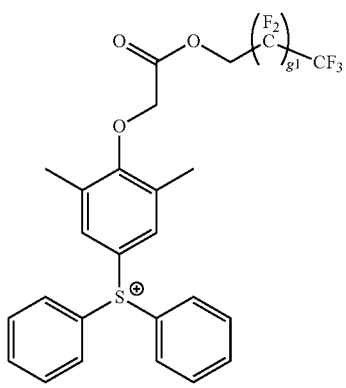
(ca-1-29)
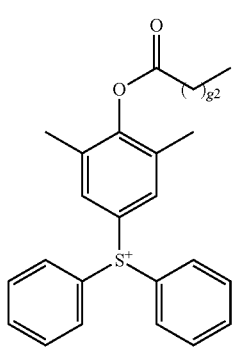
(ca-1-30)
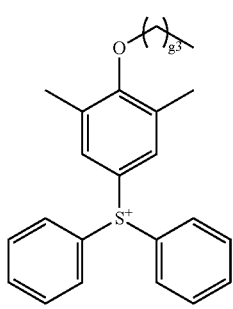
(ca-1-31)
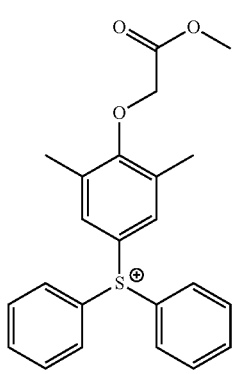
(ca-1-32)
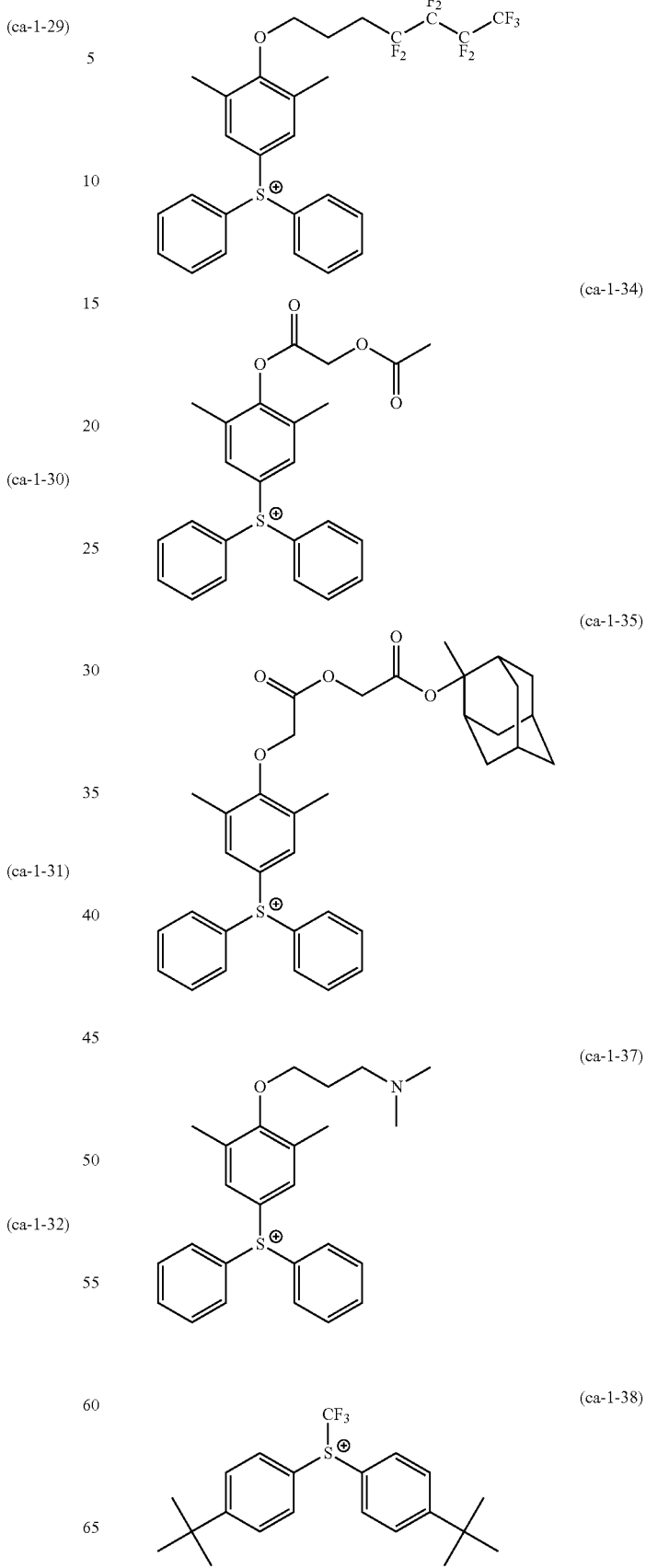

(ca-1-39) 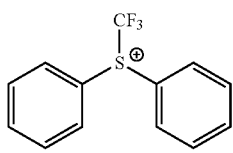
(ca-1-40) 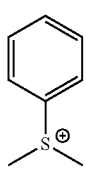
(ca-1-41) 
(ca-1-42)
(ca-1-43) 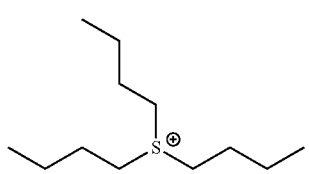
(ca-1-44) 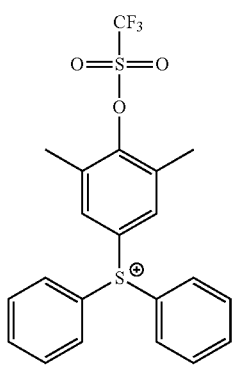
(ca-1-45)
(ca-1-46)
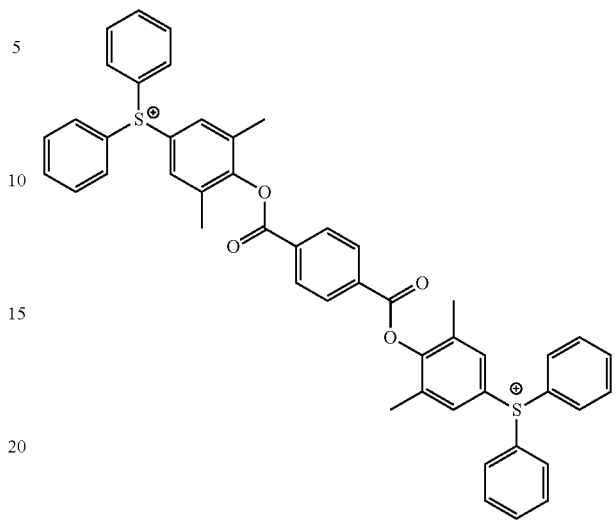
In the above formulas, each of g1, g2 and g3 represents a number of repeating units, wherein g1 represents an integer of 1 to 5, g2 represents an integer of 0 to 20, and g3 represents an integer of 0 to 20.
[Chemical Formula 11]
(ca-1-47)
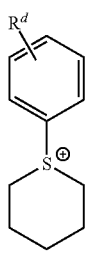

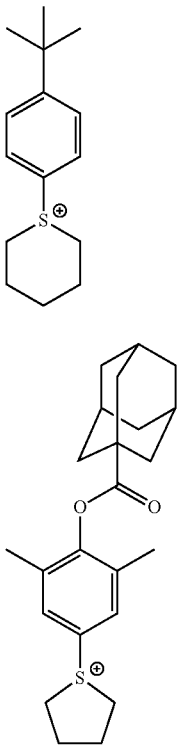
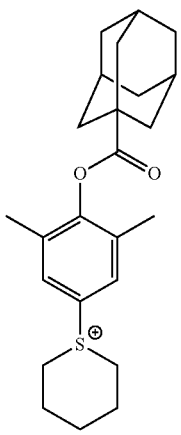
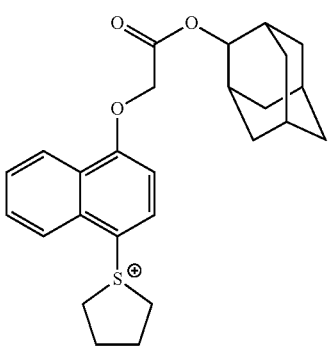

(ca-1-48)

(ca-1-49)

(ca-1-50)

(ca-1-51)

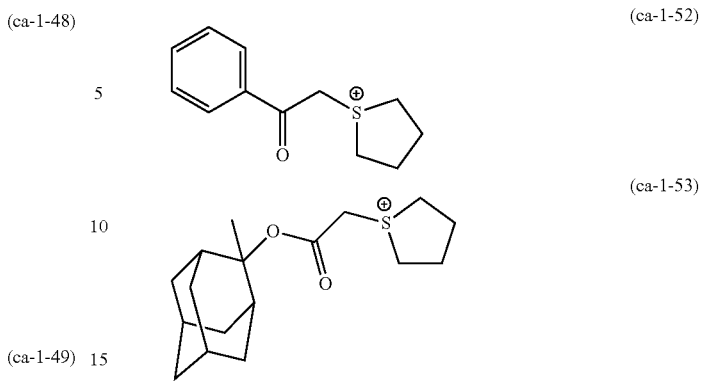

(ca-1-52)

(ca-1-53)

In formula (ca-1-47), $R^d$ represents a substituent. Examples of this substituent include the same substituents as those mentioned above in the description of the substituted aryl group (namely, an alkyl group, alkoxy group, alkoxyalkyloxy group, alkoxycarbonylalkyloxy group, halogen atom, hydroxyl group, oxo group (=O), aryl group, —C(=O)—O—$R^{6\prime}$, —O—C(=O)—$R^{7\prime}$ and —O—$R^{8\prime}$).

In the above formula (b-c2), each of $R^{5\prime\prime\prime}$ and $R^{6\prime\prime\prime}$ independently represents an aryl group, alkyl group or alkenyl group which may have a substituent.

Examples of the aryl group for $R^{5\prime\prime\prime}$ and $R^{6\prime\prime\prime}$ include the same aryl groups as those described for $R^{1\prime\prime\prime}$ to $R^{3\prime\prime\prime}$.

Examples of the alkyl group for $R^{5\prime\prime\prime}$ and $R^{6\prime\prime\prime}$ include the same alkyl groups as those described for $R^{1\prime\prime\prime}$ to $R^{3\prime\prime\prime}$.

Examples of the alkenyl group for $R^{5\prime\prime\prime}$ and $R^{6\prime\prime\prime}$ include the same alkenyl groups as those described for $R^{1\prime\prime\prime}$ to $R^{3\prime\prime\prime}$.

Specific examples of the cation moiety represented by the above formula (b-c2) include a diphenyliodonium cation and a bis(4-tert-butylphenyl)iodonium cation.

In the present description, an oxime sulfonate-based acid generator is a compound having at least one group represented by general formula (B-1) shown below, and has a feature of generating acid upon irradiation (exposure). Such oxime sulfonate-based acid generators are widely used for chemically amplified resist compositions, and any of these compounds can be selected as appropriate.

[Chemcial Formula 12]

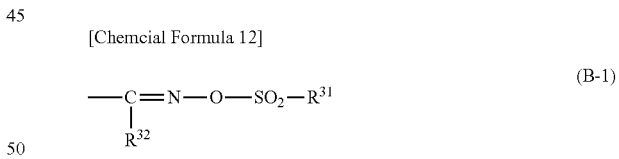

(B-1)

In formula (B-1), each of $R^{31}$ and $R^{32}$ independently represents an organic group.

The organic group for $R^{31}$ and $R^{32}$ refers to a group containing a carbon atom, and the group may also include atoms other than the carbon atom (such as a hydrogen atom, oxygen atom, nitrogen atom, sulfur atom or halogen atom (such as a fluorine atom or chlorine atom)).

The organic group for $R^{31}$ is preferably a linear, branched or cyclic alkyl group, or an aryl group. The alkyl group or the aryl group may have a substituent. There are no particular limitations on this substituent, and examples include a fluorine atom or a linear, branched or cyclic alkyl group having 1 to 6 carbon atoms. The expression that the alkyl group or aryl group "may have a substituent" means that part or all of the hydrogen atoms of the alkyl group or aryl group may each be substituted with a substituent.

The alkyl group preferably has 1 to 20 carbon atoms, more preferably 1 to 10 carbon atoms, still more preferably 1 to 8 carbon atoms, still more preferably 1 to 6 carbon atoms, and most preferably 1 to 4 carbon atoms. As the alkyl group, a partially or completely halogenated alkyl group (hereafter sometimes referred to as a "halogenated alkyl group") is particularly desirable. A "partially halogenated alkyl group" refers to an alkyl group in which part of the hydrogen atoms are substituted with halogen atoms, and a "completely halogenated alkyl group" refers to an alkyl group in which all of the hydrogen atoms are substituted with halogen atoms. Examples of the halogen atom include a fluorine atom, chlorine atom, bromine atom and iodine atom, and a fluorine atom is particularly desirable. In other words, the halogenated alkyl group is preferably a fluorinated alkyl group.

The aryl group preferably has 4 to 20 carbon atoms, more preferably 4 to 10 carbon atoms, and most preferably 6 to 10 carbon atoms. As the aryl group, a partially or completely halogenated aryl group is particularly desirable. A "partially halogenated aryl group" refers to an aryl group in which part of the hydrogen atoms are substituted with halogen atoms, and a "completely halogenated aryl group" refers to an aryl group in which all of the hydrogen atoms are substituted with halogen atoms.

$R^{31}$ is preferably an alkyl group of 1 to 4 carbon atoms which has no substituent, or a fluorinated alkyl group of 1 to 4 carbon atoms.

The organic group for $R^{32}$ is preferably a linear, branched or cyclic alkyl group, an aryl group, or a cyano group. Examples of the alkyl group and the aryl group for $R^{32}$ include the same alkyl groups and aryl groups as those described above for $R^{31}$.

$R^{32}$ is preferably a cyano group, an alkyl group of 1 to 8 carbon atoms having no substituent, or a fluorinated alkyl group of 1 to 8 carbon atoms.

Of the aforementioned diazomethane-based acid generators, specific examples of the bisalkyl or bisaryl sulfonyl diazomethanes include bis(isopropylsulfonyl)diazomethane, bis(p-toluenesulfonyl)diazomethane, bis(1,1-dimethylethylsulfonyl)diazomethane, bis(cyclohexylsulfonyl)diazomethane and bis(2,4-dimethylphenylsulfonyl)diazomethane.

Further, diazomethane-based acid generators disclosed in Japanese Unexamined Patent Application, First Publication No. Hei 11-035551, Japanese Unexamined Patent Application, First Publication No. Hei 11-035552 and Japanese Unexamined Patent Application, First Publication No. Hei 11-035573 can also be used favorably.

Furthermore, examples of poly(bis-sulfonyl)diazomethanes include the compounds disclosed in Japanese Unexamined Patent Application, First Publication No. Hei 11-322707, including 1,3-bis(phenylsulfonyldiazomethylsulfonyl)propane, 1,4-bis(phenylsulfonyldiazomethylsulfonyl)butane, 1,6-bis(phenylsulfonyldiazomethylsulfonyl)hexane, 1,10-bis(phenylsulfonyldiazomethylsulfonyl)decane, 1,2-bis(cyclohexylsulfonyldiazomethylsulfonyl)ethane, 1,3-bis(cyclohexylsulfonyldiazomethylsulfonyl)propane, 1,6-bis(cyclohexylsulfonyldiazomethylsulfonyl)hexane, and 1,10-bis(cyclohexylsulfonyldiazomethylsulfonyl)decane.

As the component (B), one of the aforementioned types of acid generator may be used alone, or a combination of two or more types of acid generators may be used.

In those cases where the undercoat agent includes the component (B), the amount of the component (B) within the resist composition, in the case of a thermal acid generator, is preferably within a range from 0.5 to 30 parts by weight, and more preferably 1 to 20 parts by weight, per 100 parts by weight of the component (A). If the component (B) is a photo-acid generator, then the amount of the component (B) is preferably within a range from 0.5 to 30 parts by weight, and more preferably from 1 to 20 parts by weight, per 100 parts by weight of the component (A). By ensuring that the amount of the component (B) satisfies the above range, the effects of the present invention can be obtained satisfactorily. By ensuring that the amount of the component (B) is at least as large as the lower limit of the above range, the amount of the component (A) within the undercoat agent need not be unnecessarily reduced, which is desirable.

If desired, other miscible additives can also be added to the undercoat agent of the present invention. For example, appropriate amounts of additive resins for improving the performance of the layer composed of the undercoat agent, surfactants for improving the applicability, dissolution inhibitors, plasticizers, stabilizers, colorants, halation prevention agents, dyes, sensitizers, base-generating agents, basic compounds, and nitrogen-containing basic compounds such as imidazole may be added as required.

[Organic Solvent; Component (S)]

The undercoat agent of the present invention can be prepared by dissolving the materials for the undercoat agent in an organic solvent (hereafter frequently referred to as "component (S)").

The component (S) may be any organic solvent which can dissolve the respective components to give a uniform solution, and one or more types of organic solvent can be selected appropriately from among those solvents conventionally known as solvents for film-forming compositions containing a resin as the main component.

Specific examples of the solvent include lactones such as γ-butyrolactone; ketones such as acetone, methyl ethyl ketone, cyclohexanone, methyl-n-pentyl ketone, methyl isopentyl ketone and 2-heptanone; polyhydric alcohols such as ethylene glycol, diethylene glycol, propylene glycol and dipropylene glycol; polyhydric alcohol derivatives including compounds having an ester bond, such as ethylene glycol monoacetate, diethylene glycol monoacetate, propylene glycol monoacetate and dipropylene glycol monoacetate, and compounds having an ether bond, such as a monoalkyl ether (such as a monomethyl ether, monoethyl ether, monopropyl ether or monobutyl ether) or a monophenyl ether of any of the above polyhydric alcohols or compounds having an ester bond [among these derivatives, propylene glycol monomethyl ether acetate (PGMEA) and propylene glycol monomethyl ether (PGME) are preferred]; cyclic ethers such as dioxane; esters such as methyl lactate, ethyl lactate (EL), methyl acetate, ethyl acetate, butyl acetate, methyl pyruvate, ethyl pyruvate, methyl methoxypropionate and ethyl ethoxypropionate; and aromatic organic solvents such as anisole, ethyl benzyl ether, cresyl methyl ether, diphenyl ether, dibenzyl ether, phenetole, butyl phenyl ether, ethylbenzene, diethylbenzene, pentylbenzene, isopropylbenzene, toluene, xylene, cymene and mesitylene.

These organic solvents may be used individually, or as a mixed solvent containing two or more solvents.

Among these possibilities, propylene glycol monomethyl ether acetate (PGMEA), propylene glycol monomethyl ether (PGME), cyclohexanone and ethyl lactate (EL) are preferable.

Further, among the mixed solvents, a mixed solvent obtained by mixing PGMEA with a polar solvent is preferable. The mixing ratio (weight ratio) of the mixed solvent can be determined as appropriate, taking into consideration the compatibility of the PGMEA with the polar solvent, but is preferably in within a range from 1:9 to 9:1, and more preferably from 2:8 to 8:2. For example, when EL is mixed as the polar solvent, the PGMEA:EL weight ratio is preferably from 1:9 to 9:1, and more preferably from 2:8 to 8:2. Alternatively, when PGME is mixed as the polar solvent, the PGMEA: PGME weight ratio is preferably from 1:9 to 9:1, more preferably from 2:8 to 8:2, and still more preferably from 3:7 to 7:3. Alternatively, when PGME and cyclohexanone are mixed as the polar solvents, the PGMEA:(PGME+cyclohexanone) weight ratio is preferably from 1:9 to 9:1, more preferably from 2:8 to 8:2, and still more preferably 3:7 to 7:3.

Further, as the component (S), a mixed solvent of PGMEA, EL or an aforementioned mixed solvent of PGMEA and a polar solvent, with γ-butyrolactone is also preferable. In this case, the mixing ratio (former:latter) of such a mixed solvent is preferably from 70:30 to 95:5.

There are no particular limitations on the amount used of the component (S), which may be adjusted appropriately to produce a concentration that enables application of a coating solution onto a substrate in accordance with the desired thickness of the coating film. In general, the organic solvent is used in an amount that yields a solid fraction concentration for the undercoat agent that is within a range from 1 to 20% by weight, and preferably from 2 to 15% by weight.

<<Pattern Formation Method for Layer containing Block Copolymer>>

The second aspect of the present invention is a pattern formation method for a layer containing a block copolymer (hereafter also referred to as simply "the pattern formation method"), the method including:

a step (1) of applying the undercoat agent of the first aspect described above to a substrate, and forming a layer composed of the undercoat agent, a step (2) of forming a layer containing a block copolymer having a plurality of blocks bonded on the surface of the layer composed of the undercoat agent, and then performing phase separation of the layer containing the block copolymer, and a step (3) of selectively removing, from the layer containing the block copolymer, a phase composed of at least one type of polymer block among the plurality of types of polymer blocks that constitute the block copolymer.

A detailed description of the pattern formation method of the present invention is presented below, with reference to the drawings, but it should be noted that the present invention is in no way limited by the following description.

FIG. 1 illustrates an embodiment of the pattern formation method of the present invention.

In this embodiment, the undercoat agent according to the first aspect is first applied to a substrate 1, thereby forming a layer 2 composed of the undercoat agent (step (1)). Subsequently, a layer 3 containing a block copolymer having a plurality of blocks bonded is formed by a coating method or the like on the surface of the layer 2 composed of the undercoat agent, and the layer 3 containing the block copolymer is then subjected to phase separation (step (2)). Finally, by selectively removing, from the layer 3 containing the block copolymer, a phase 3a composed of at least one type of block among the plurality of types of blocks that constitute the block copolymer, a pattern can be formed (step (3)).

[Step (1)]

There are no particular limitations on the substrate 1, provided that the substrate does not dissolve or mix when the undercoat agent or the block copolymer is applied, and the types of conventional materials used as the substrates for electronic components and the like can be used.

Specific examples of the substrate 1 include metal substrates formed from silicon wafer, gold, copper, chromium, iron or aluminum or the like, metal oxide substrates formed by oxidation of the above metals, glass substrates, and polymer films (such as polyethylene, polyethylene terephthalate, polyimide and benzocyclobutene). In those cases where a undercoat agent having a trialkoxysilyl group as the substrate interaction group is used in the step (2), the use of a substrate formed from a silicon wafer as the substrate 1 is preferable.

Further, there are no particular limitations on the size or shape of the substrate 1. The substrate need not necessarily have a smooth surface, and substrates of various shapes formed from all manner of materials can be selected as appropriate. For example, substrates having a curved surface, flat substrates having surface asperity, and even thin flake-shaped substrates can be used.

A substrate prepared by providing an inorganic and/or organic film on the surface of an aforementioned substrate may also be used as the substrate 1, and providing an organic film on the substrate is preferable. As the inorganic film, an inorganic antireflection film (inorganic BARC) can be used. As the organic film, an organic antireflection film (organic BARC) can be used.

An inorganic film can be formed, for example, by applying an inorganic antireflection film composition such as a silicon-based material to the substrate, and then performing baking.

An organic film can be formed, for example, by applying an organic film-forming material, prepared by dissolving the resin component and the like that constitute the film in an organic solvent, to the surface of the substrate using a spinner or the like, and then performing a bake treatment under heating conditions including a temperature that is preferably within a range from 200 to 300° C. and a heating time that is preferably within a range from 30 to 300 seconds, and more preferably from 60 to 180 seconds. The organic film-forming material used in this process need not necessarily exhibit the type of sensitivity to light or an electron beam that a resist film possesses, and may or may not exhibit this type of sensitivity. Specifically, the types of resists and resins typically used in the production of semiconductor elements and liquid crystal display elements can be used.

In order to enable an organic film pattern to be formed, by using the pattern formed from the block copolymer to etch the organic film, thereby transferring the pattern to the organic film, the organic film-forming material is preferably a material that is capable of forming an organic film that can be subjected to etching, and particularly dry etching. Among such materials, a material that can form an organic film that can be subjected to etching by oxygen plasma etching or the like is particularly desirable. Examples of this type of organic film-forming material include the materials conventionally used for forming organic films such as organic BARC. Specific examples of these materials include the ARC series of products manufactured by Brewer Science Ltd., the AR series of products manufactured by Rohm and Haas Company, and the SWK series of products manufactured by Tokyo Ohka Kogyo Co., Ltd.

Because the undercoat agent according to the first aspect of the present invention includes the aforementioned substrate interaction group, a favorable interaction between the substrate 1 and the layer 2 composed of the undercoat agent can be achieved even when a substrate provided with the type of organic film mentioned above is used, thus enabling the layer 2 composed of the undercoat agent to exhibit excellent strength and adhesion.

Further, the surface of the substrate 1 may be cleaned in advance. Cleaning the substrate surface can sometimes facilitate the neutralization reaction treatment performed later.

The cleaning treatment can employ conventional methods such as an oxygen plasma treatment, ozone oxidation treatment, acid-alkali treatment or chemical modification treatment.

There are no particular limitations on the method used for applying the undercoat agent to the substrate 1 to form the layer 2 composed of the undercoat agent, and conventional methods can be used.

For example, the layer 2 composed of the undercoat agent can be formed by applying the undercoat agent to the substrate 1 using a conventional method such as spin coating to form a coating film, and then drying the coating film to form the layer 2.

The method used for drying the coating film may be any method that enables the organic solvent (the component (S)) contained within the undercoat agent to be volatilized, and for example, a method that uses baking may be used.

The baking temperature is preferably within a range from 80 to 300° C., more preferably from 100 to 270° C., and still more preferably from 120 to 250° C. The baking time is preferably within a range from 30 to 500 seconds, and more preferably from 60 to 240 seconds.

In those cases where the undercoat agent includes an acid generator that generates acid upon heating as the component (B), a favorable layer 2 composed of the undercoat agent can be obtained under the action of the acidic compound or the acid even if the aforementioned baking time is shortened. When the component (B) in the undercoat agent is a photoacid generator, light or an electron beam or the like may be irradiated onto the layer before or after baking to generate the acid. The irradiation can be performed using a typical method.

By providing the layer 2 composed of the undercoat agent on the surface of the substrate 1, the surface of the substrate 1 is neutralized, and therefore of the layer 3 containing the block copolymer provided on top of the substrate, only a phase composed of a specific block is inhibited from making contact with the substrate surface. As a result, a phase separation of the layer 3 containing the block copolymer is achieved, enabling the formation of a freely oriented cylinder structure, dot structure or gyroid structure or the like on the substrate surface.

Further, following completion of the step (1) and prior to commencement of the step (2) (namely, prior to formation of the layer 3 containing the block copolymer), a guide pattern may be provided in advance on the layer 2 composed of the undercoat agent. This enables the oriented structure of the phase separation structure to be controlled in accordance with the shape and surface properties of the guide pattern. For example, even in the case of a block copolymer that forms a random fingerprint-like phase separation structure in the absence of a guide pattern, by introducing a resist film grooved structure on the substrate surface, a phase separation structure that is aligned with the grooves can be obtained. A guide pattern may be introduced under these types of principles. Further, providing the surface of the guide pattern with affinity for one of the polymer blocks that constitute the block copolymer facilitates the formation of a phase separation structure formed from a lamellar structure or cylinder structure that is oriented in a perpendicular direction relative to the substrate surface.

In a specific example, a resist composition is applied to the surface of the substrate using a spinner or the like, a prebake treatment (post applied bake (PAB)) is conducted under temperature conditions of 80 to 150° C. for 40 to 120 seconds, and preferably 60 to 90 seconds, to form a resist film, an ArF exposure apparatus or the like is then used to selectively expose this resist film with an ArF excimer laser through a desired mask pattern, and the resist film is then subjected to a post exposure bake treatment (PEB) under temperature conditions of 80 to 150° C. for 40 to 120 seconds, and preferably 60 to 90 seconds. Subsequently, the resist film is subjected to a developing treatment using, for example, a 0.1 to 10% by weight aqueous solution of tetramethylammonium hydroxide (TMAH), and is then preferably rinsed in pure water and dried. Further, in some cases, a bake treatment (post bake) may be conducted following the developing treatment. In this manner, a guide pattern that is faithful to the mask pattern can be formed.

The height of the guide pattern from the substrate surface (or from the neutralized film surface) is preferably at least as thick as the layer containing the block copolymer formed on the substrate surface. The height of the guide pattern from the substrate surface (or from the neutralized film surface) can be adjusted appropriately by altering the thickness of the resist film formed by application of the resist composition that forms the guide pattern.

The resist composition that forms the guide pattern can be selected appropriately from among the resist compositions typically used for forming resist patterns and modified products thereof, by selecting a composition that has affinity for one of the polymer blocks that constitute the block copolymer. The resist composition may be either a positive-type composition that forms a positive pattern by dissolution and removal of the exposed portions, or a negative-type composition that forms a negative pattern by dissolution and removal of the unexposed portions, but is preferably a negative-type resist composition. The negative-type resist composition contains, for example, an acid generator and a base component that exhibits reduced solubility in a developing solution containing an organic solvent under the action of acid, wherein the base component preferably contains a resin component having a structural unit that decomposes and exhibits increased polarity under the action of acid.

Furthermore, following application of the solution of the block copolymer onto the substrate surface on which the guide pattern has been formed, a heat treatment is performed to effect the phase separation. Accordingly, the resist composition used for forming the guide pattern is preferably capable of forming a resist film having excellent solvent resistance and heat resistance.

[Step (2)]

There are no particular limitations on the method used for forming the layer 3 containing the block copolymer having a plurality of types of blocks bonded on top of the aforementioned layer 2 composed of the undercoat agent, and for example, the layer 3 can be formed by applying a composition containing the block copolymer to the layer 2 composed of the undercoat agent. Examples of the method used for applying the composition include the same methods as those mentioned above for applying the undercoat agent.

In the present invention, the thickness of the layer 3 containing the block copolymer must be sufficiently thick to ensure phase separation can occur, and although there are no particular limitations on the lower limit for the thickness, if due consideration is given to the size of the structure period within the formed phase separation structure, and the uniformity of nanostructures, then the thickness of the layer 3 is preferably at least 5 nm, and more preferably 10 nm or greater.

(Composition Containing Block Copolymer)

Block Copolymer

In the present invention, the term "block copolymer" describes a polymer containing a plurality of bonded partial structural components (blocks), each composed solely of structural units of the same type bonded together. The number of block types within the block copolymer may be either two types, or three or more types. In the present invention, there are no particular limitations on the plurality of types of blocks that constitute the block copolymer, provided they represent a combination that undergoes phase separation, but a combination of blocks that are mutually immiscible is preferable. Furthermore, it is preferable that a phase composed of at least one type of block among the plurality of types of blocks that constitute the block copolymer is able to be selectively removed easily from the other phase(s) composed of the other type(s) of block(s).

Examples of the block copolymer include:
- a block copolymer in which a block of a structural unit derived from a styrene or a derivative thereof, and a block of a structural unit derived from an (α-substituted) acrylate ester are bonded to each other,
- a block copolymer in which a block of a structural unit derived from a styrene or a derivative thereof, and a block of a structural unit derived from a siloxane or a derivative thereof are bonded to each other, and
- a block copolymer in which a block of a structural unit derived from an alkylene oxide, and a block of a structural unit derived from an (α-substituted) acrylate ester are bonded to each other.

The structural unit derived from a styrene or a derivative thereof, and the structural unit derived from an (α-substituted) acrylate ester are the same as described above.

Examples of the siloxane derivative include dimethylsiloxane, diethylsiloxane, diphenylsiloxane and methylphenylsiloxane.

Examples of the alkylene oxide include ethylene oxide, propylene oxide, isopropylene oxide and butylene oxide.

Among the various possibilities, the use of a block copolymer having a block of a structural unit derived from a styrene or a derivative thereof, and a block of a structural unit derived from an (α-substituted) acrylate ester bonded to each other is preferable.

Specific examples of such block copolymers include polystyrene-poly(methyl methacrylate) (PS-PMMA) block copolymers, polystyrene-poly(ethyl methacrylate) block copolymers, polystyrene-poly(t-butyl methacrylate) block copolymers, polystyrene-polymethacrylic acid block copolymers, polystyrene-poly(methyl acrylate) block copolymers, polystyrene-poly(ethyl acrylate) block copolymers, polystyrene-poly(t-butyl acrylate) block copolymers, and polystyrene-polyacrylic acid block copolymers. Of these, the use of a PS-PMMA block copolymer is particularly desirable.

Although there are no particular limitations on the weight-average molecular weight (Mw) (the polystyrene-equivalent value determined by gel permeation chromatography) of each polymer block that constitutes the block copolymer, provided that the size of the block enables phase separation to occur, the molecular weight is preferably within a range from 5,000 to 500,000, more preferably from 5000 to 400,000, and still more preferably from 5,000 to 300,000.

Further, the dispersity (Mw/Mn) of the block copolymer is preferably within a range from 1.0 to 3.0, more preferably from 1.0 to 1.5, and still more preferably from 1.0 to 1.2. Here, Mn represents the number-average molecular weight.

If desired, other miscible additives besides the aforementioned block copolymer can also be added to the composition containing the block copolymer. For example, appropriate amounts of additive resins for improving the performance of the layer composed of the undercoat agent, surfactants for improving the applicability, dissolution inhibitors, plasticizers, stabilizers, colorants, halation prevention agents, dyes, sensitizers, base-generating agents and basic compounds may be added as required.

Organic Solvent

The composition containing the block copolymer can be prepared by dissolving the aforementioned block copolymer in an organic solvent. Examples of organic solvents that may be used include the same solvents as those mentioned above for the component (S) used as the organic solvent for the undercoat agent.

There are no particular limitations on the amount used of the organic solvent, which may be adjusted appropriately to produce a concentration that enables application of the solution in accordance with the desired thickness of the formed film. In general, the organic solvent is used in an amount that yields a solid fraction concentration for the block copolymer that is within a range from 0.2 to 70% by weight, and preferably from 0.2 to 50% by weight.

The phase separation of the layer 3 containing the block copolymer is performed by subjecting the substrate 1, which has the layer 2 composed of the undercoat agent formed thereon and the layer 3 containing the block copolymer formed on top of the layer 2, to a heat treatment followed by selective removal of part of the block copolymer in a subsequent step, thus forming a phase separation structure that exposes at least a portion of the substrate surface. The temperature of the heat treatment is preferably at least as high as the glass transition temperature but less than the thermal decomposition temperature of the block copolymer being used. For example, when the block copolymer is PS-PMMA (Mw: 40,000-20,000), the heat treatment is preferably performed at a temperature of 180 to 270° C. for a period of 30 to 3,600 seconds.

Further, the heat treatment is preferably performed within a gas that exhibits low reactivity such as nitrogen.

[Step (3)]

In the step (3), a pattern is formed by selectively removing, from the layer 3 containing the aforementioned block copolymer, a phase 3a composed of at least one type of block among the plurality of types of blocks that constitute the block copolymer.

In the following description, the block among the plurality of types of blocks that constitute the block copolymer that is not selectively removed in the subsequent step is referred to as the $P_A$ block, and the block that is selectively removed is referred to as the $P_B$ block. For example, by subjecting a layer containing a PS-PMMA block copolymer to phase separation, and then subjecting the layer to an oxygen plasma treatment or hydrogen plasma treatment, the phase composed of the PMMA is selectively removed. In this case, the PS represents the $P_A$ block and the PMMA represents the $P_B$ block.

Subsequently, following formation of a phase separation structure, at least a portion of the blocks within the phase composed of the $P_B$ block in the layer containing the block copolymer on the substrate is selectively removed (molecular weight reduction). By selectively removing a portion of the $P_B$ block in advance, the solubility in a developing solution is enhanced, and as a result, the phase composed of the $P_B$ block can be more easily selectively removed from the phase composed of the $P_A$ block.

There are no particular limitations on this type of selective removal treatment, provided it enables the $P_B$ block to be decomposed and removed without having an effect on the $P_A$ block, and the treatment may be selected appropriately from among those techniques used for removing resin films, in accordance with the properties of the $P_A$ block and the $P_B$ block. Further, in those cases where a neutralized film is formed in advance on the substrate surface. The neutralized film can be removed in the same manner as the phase composed of the $P_B$ block. Specific examples of the removal treatment include an oxygen plasma treatment, ozone treatment, UV irradiation treatment, thermal decomposition treatment, and chemical decomposition treatment.

The substrate on which a pattern $3b$ has been formed via the phase separation of the layer 3 containing the block copolymer in the manner described above can be used without further modification, or may be subjected to an additional heat treatment to alter the shape of the polymer nanostructure on the substrate. The temperature of this heat treatment is preferably at least as high as the glass transition temperature but less than the thermal decomposition temperature of the block copolymer being used. Further, the heat treatment is preferably performed within a gas that exhibits low reactivity such as nitrogen.

In the aforementioned pattern formation method for a layer containing a block copolymer, the shape and size of the phase that is selectively removed (namely, the phase composed of the block $P_B$) is determined by the component ratio between the blocks that constitute the block copolymer, and the molecular weight of the block copolymer. For example, by making the volumetric component ratio of the $P_B$ block within the block copolymer comparatively small, a cylinder structure can be formed in which the phase composed of the $P_B$ block exists as cylindrical shapes within the phase composed of the $P_A$ block. Alternatively, if the volumetric component ratios of the $P_B$ block and the $P_A$ block within the block copolymer are substantially equal, then a lamellar structure can be formed in which the phase composed of the $P_A$ block and the phase composed of the $P_B$ block are layered in an alternating manner. Further, by increasing the molecular weight of the block copolymer, the size of each phase can be increased.

EXAMPLES

A more detailed description of the present invention is presented below based on a series of examples, although the scope of the present invention is in no way limited by these examples.

[Production of Polymeric Compounds 1 to 15]

Polymeric compounds 1 to 15 were synthesized by normal methods, using monomers (1) to (10) shown below in the molar ratios shown in Tables 1 and 2 to form the structural units that constitute each of the polymeric compounds. The molecular weight (Mw) and molecular weight dispersity (Mw/Mn) of each of the obtained polymeric compounds are also shown in Tables 1 and 2.

[Chemical Formula 13]

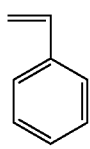

(1)

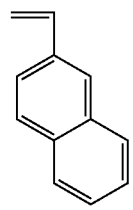

(2)

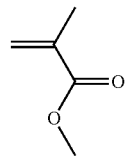

(3)

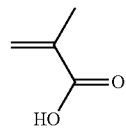

(4)

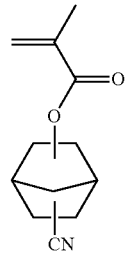

(5)

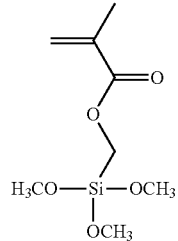

(6)

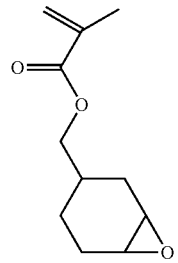

(7)

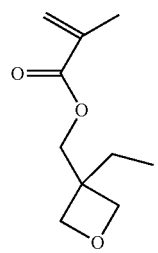

(8)

-continued

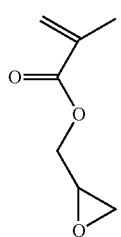
(9)

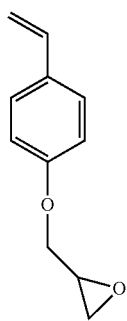
(10)

was added as required, and 12,400 parts by weight of PGMEA, and the mixtures were dissolved to prepare a series of undercoat agents.

The thus obtained undercoat agent of each example was applied to a silicon wafer (Si substrate) using a spinner, and a bake treatment was then performed at 150° C. for 60 seconds to form a layer composed of the undercoat agent having a thickness of 10 nm.

Next, the layer was spun while a rinse was performed using PGMEA for 15 seconds, and the thickness (nm) of the layer composed of the undercoat agent was then measured using a UTFTA-200 (a product name, manufactured by Litho Tech Japan Corporation). The measured thickness was 10 nm for Examples 8 and 9, and not more than 1 nm for the remaining examples.

Next, a solution (solvent: PGMEA) containing the block copolymer shown in Table 3 and having a solid fraction concentration of 1.8% by weight was spin coated onto the substrate having the layer composed of the undercoat agent formed thereon, thus forming a coating film having a thickness of 60 nm.

Subsequently, a heat treatment was performed under a stream of nitrogen at 240° C. for 60 seconds, thus forming a phase separation structure.

TABLE 1

| | | Polymeric compound | | | | | | | | | |
|---|---|---|---|---|---|---|---|---|---|---|---|
| | | 1 | 2 | 3 | 4 | 5 | 6 | 7 | 8 | 9 | 10 |
| Monomer | (1) | 45 | 45 | 45 | 20 | | 75 | 80 | 80 | 80 | 75 |
| | (2) | | | | | 50 | | | | | |
| | (3) | | | | | | | | | | |
| | (4) | | | 5 | | 5 | | 5 | | | |
| | (5) | 5 | | | 5 | | | | 5 | | |
| | (6) | | 5 | | | | 5 | | | 5 | 5 |
| | (7) | 50 | 50 | 50 | 75 | 45 | | | 15 | 15 | |
| | (8) | | | | | | 20 | | | | |
| | (9) | | | | | | | 15 | | | 20 |
| | (10) | | | | | | | | | | |
| Mw | | 40,000 | 8,000 | 100,000 | 40,000 | 40,000 | 10,000 | 40,000 | 40,000 | 40,000 | 40,000 |
| Mw/Mn | | 1.9 | 1.7 | 1.7 | 1.7 | 1.9 | 1.8 | 1.7 | 1.9 | 1.7 | 1.7 |

TABLE 2

| | | Polymeric compound | | | | |
|---|---|---|---|---|---|---|
| | | 11 | 12 | 13 | 14 | 15 |
| Monomer | (1) | 75 | 70 | 70 | 70 | |
| | (2) | | | | 30 | |
| | (3) | | 10 | | | |
| | (4) | | | | | |
| | (5) | | | | | |
| | (6) | 5 | 5 | 15 | | |
| | (7) | | | 15 | | 100 |
| | (8) | | 15 | | | |
| | (9) | | | | | |
| | (10) | 20 | | | | |
| Mw | | 40,000 | 40,000 | 40,000 | 40,000 | 40,000 |
| Mw/Mn | | 1.7 | 1.7 | 1.7 | 1.7 | 1.7 |

Examples 1 to 15, Comparative Examples 1 and 2

First, 100 parts by weight samples of the polymeric compounds shown in Tables 1 and 2 were each mixed with 1 part by weight of an acid generator that was added as required, 5 parts by weight of a nitrogen-containing basic compound that was added as required, and 12,400 parts by weight of PGMEA.

Using a TCA-3822 apparatus (manufactured by Tokyo Ohka Kogyo Co., Ltd.), the substrate having the phase separation structure formed thereon was subjected to an oxygen plasma treatment (200 mL/min, 40 Pa, 40° C., 200 W, 20 seconds) to selectively remove the phase composed of PMMA, and the surface of the thus obtained substrate was then inspected using a scanning electron microscope SEM SU8000 (manufactured by Hitachi High-Technologies Corporation). Substrates for which a uniform pattern (a perpendicular lamellar pattern) was observed were evaluated as A, substrates for which portions were observed in which a uniform pattern (perpendicular lamellar pattern) was not formed were evaluated as B, and substrates for which a uniform pattern (perpendicular lamellar pattern) was not observed were evaluated as C. The results are shown in Table 3.

TABLE 3

|  | Acid generator | Nitrogen-containing basic compound | Block copolymer | SEM observation |
|---|---|---|---|---|
| Example 1 | (A)-1 |  | (BP)-1 | B |
| Example 2 | (A)-2 |  | (BP)-1 | A |
| Example 3 | (A)-3 |  | (BP)-1 | A |
| Example 4 | (A)-4 |  | (BP)-1 | B |
| Example 5 | (A)-5 |  | (BP)-1 | A |
| Example 6 | (A)-6 |  | (BP)-1 | A |
| Example 7 | (A)-7 | (B)-1 | (BP)-2 | A |
| Example 8 | (A)-7 | (D)-1 | (BP)-1 | A |
| Example 9 | (A)-7 |  | (BP)-1 | A |
| Example 10 | (A)-8 |  | (BP)-2 | B |
| Example 11 | (A)-9 |  | (BP)-2 | A |
| Example 12 | (A)-10 |  | (BP)-1 | A |
| Example 13 | (A)-11 |  | (BP)-1 | A |
| Example 14 | (A)-12 |  | (BP)-1 | A |
| Example 15 | (A)-13 |  | (BP)-1 | A |
| Comparative Example 1 | (A)-14 |  | (BP)-1 | C |
| Comparative Example 2 | (A)-15 |  | (BP)-1 | C |

In Table 3, the reference characters have the following meanings. Further, the numerical values in brackets [ ] indicate the amount (in parts by weight) of the component added.

(A)-1 to (A)-15: the aforementioned polymeric compounds 1 to 15 respectively (B)-1: a compound represented by chemical formula (B)-1 shown below (D)-1: imidazole (BP)-1: a PS-PMMA block copolymer (Mw=18,000-18,000, Mw/Mn=1.07)

(BP)-2: a PS-PMMA block copolymer (Mw=45,000-20,000, Mw/Mn=1.07)

[Chemical Formula 14]

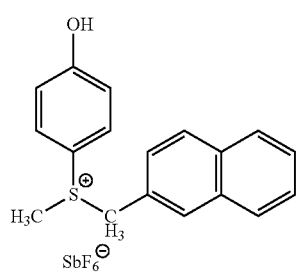

(B)-1

Based on the results shown above, it was confirmed that when the undercoat agents of Examples 1 to 15 according to the present invention were used, phase separation of the layer containing the block copolymer enabled a more favorable pattern to be obtained than that obtained when the undercoat agents of Comparative Examples 1 and 2 were used.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A pattern formation method for a layer containing a block copolymer, the method comprising:

applying an undercoat agent to a substrate, and forming a layer comprising the undercoat agent, wherein the undercoat agent comprises a resin component comprising a structural unit having an aromatic ring and a structural unit having no aromatic ring, and the resin component comprises a group which can interact with the substrate selected from the group consisting of a carboxy group, a cyano group, an amino group and a trimethoxysilyl group, and includes a 3 to 7-membered, ether-containing cyclic group;

forming a layer containing a block copolymer having a plurality of blocks bonded on a surface of the layer comprising the undercoat agent, and then performing phase separation of the layer containing the block copolymer; and selectively removing, from the layer containing the block copolymer, a phase comprising at least one type of block among the plurality of types of blocks that constitute the block copolymer.

2. The method of forming a pattern of a layer containing a block copolymer according to claim 1, wherein the amount of the structural unit having an aromatic ring, based on the combined total of all structural units constituting the resin component is 10 to 95 mol %.

3. The method of forming a pattern of a layer containing a block copolymer according to claim 1, wherein the structural unit having an aromatic ring is a structural unit derived from a compound selected from the group consisting of an aromatic compound which contains a vinyl group and has 6 to 18 carbon atoms, an aromatic compound which contains a (meth)acryloyl group and has 6 to 18 carbon atoms and a phenolic compound which is a component of a novolac resin.

4. The method of forming a pattern of a layer containing a block copolymer according to claim 1, further comprising an acid generator component that generates acid upon heating or exposure.

5. The method of forming a pattern of a layer containing a block copolymer according to claim 1, wherein the structural unit having an aromatic ring is at least one structural unit selected from the group consisting of structural units represented by general formulas (a1-1) to (a1-4) shown below;

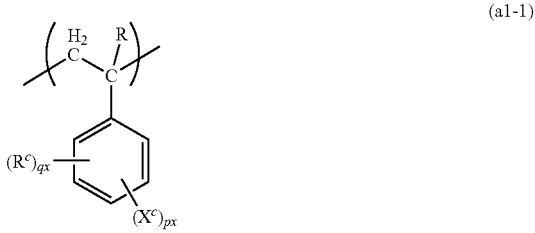

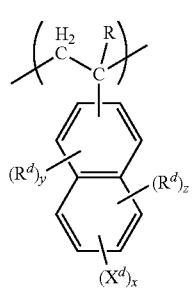

(a1-2)

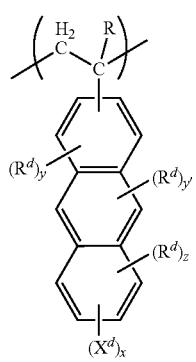

(a1-3)

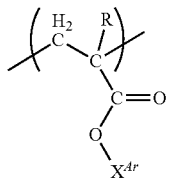

(a1-4)

wherein R represents a hydrogen atom, an alkyl group of 1 to 5 carbon atoms, or a halogenated alkyl group of 1 to 5 carbon atoms; $X^c$ and $X^d$ each independently represents a hydrogen atom, a hydroxyl group, a cyano group or an organic group; $R^c$ and $R^d$ each independently represents a halogen atom, —$COOX^c$ (wherein $X^c$ represents a hydrogen atom or an organic group), an alkyl group of 1 to 5 carbon atoms or a halogenated alkyl group of 1 to 5 carbon atoms; px represents an integer of 0 to 3, qx represents an integer of 0 to 5, provided that px+qx is from 1 to 5, when qx is an integer of 2 or greater, the plurality of $R^c$ groups may be the same or different; x represents an integer of 0 to 3, y represents an integer of 0 to 3, y' represents an integer of 0 to 2, and z represents an integer of 0 to 4, provided that x+y+z in formula (a1-2) is from 1 to 7 and x+y+y'+z in formula (a1-3) is from 1 to 7, when y+z or y+y'+z is an integer of 2 or greater, the plurality of $R^d$ groups may be the same or different; $X^{Ar}$ represents a monovalent organic group having an aromatic ring.

6. The method of forming a pattern of a layer containing a block copolymer according to claim 1, wherein the structural unit having no aromatic ring is at least one structural unit selected from the group consisting of structural units represented by general formulas (a2-1) and (a2-2) shown below;

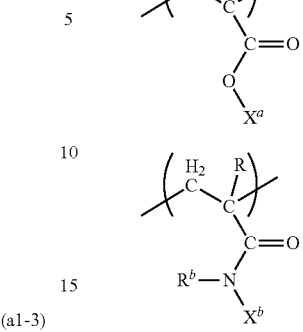

(a2-1)

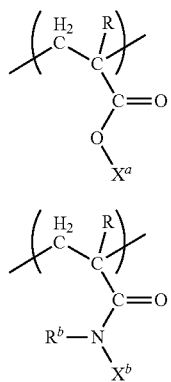

(a2-2)

wherein R represents a hydrogen atom, an alkyl group of 1 to 5 carbon atoms or a halogenated alkyl group of 1 to 5 carbon atoms; $X^a$ and $X^b$ each independently represents a hydrogen atom or an organic group not having an aromatic ring, and $R^b$ represents a hydrogen atom or an alkyl group of 1 to 5 carbon atoms.

7. The method of forming a pattern of a layer containing a block copolymer according to claim 1, wherein at least one structural unit selected from the group consisting of the structural unit having an aromatic ring and the structural unit having no aromatic ring is represented by the general formulae (e-1), (e-2) and (e-3)

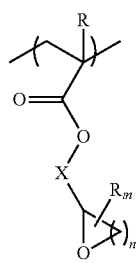

(e-1)

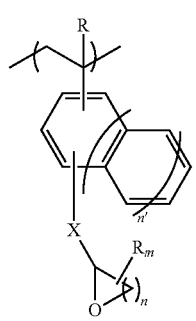

(e-2)

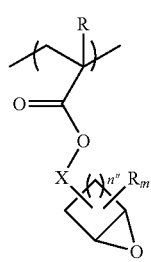

(e-3)

wherein R represents a hydrogen atom, an alkyl group of 1 to 5 carbon atoms or a halogenated alkyl group of 1 to 5 carbon atoms; X represents a single bond or an alkylene group of 1 to 3 carbon atoms; n represents an integer of 1 to 5; $R_m$ represents a hydrogen atom or an alkyl group of 1 to 5 carbon atoms; n' represents an integer of 0 to 2; and n" represents an integer of 1 to 4.

8. The method of forming a pattern of a layer containing a block copolymer according to claim 1, wherein the structural unit having no aromatic ring comprises the group which can interact with the substrate.

9. The method of forming a pattern of a layer containing a block copolymer according to claim 1, wherein the structural unit having no aromatic ring is at least one structural unit represented by any one of formulas (a21-1) and (a21-2) shown below;

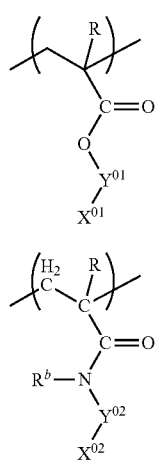

(a21-1)

(a21-2)

wherein R represents a hydrogen atom, an alkyl group of 1 to 5 carbon atoms or a halogenated alkyl group of 1 to 5 carbon atoms; $R^b$ represents a hydrogen atom or an alkyl group of 1 to 5 carbon atoms; $Y^{01}$ represents a single bond or a divalent linking group not having an aromatic ring; $X^{01}$ represents a hydrogen atom, a carboxyl group, a cyano group, an amino group or a trialkoxysilyl group, provided that when $X^{01}$ represents a hydrogen atom, $Y^{01}$ represents a single bond, and when $X^{01}$ represents a carboxyl group, a cyano group, an amino group or a trialkoxysilyl group, $Y^{01}$ represents a divalent linking group not having an aromatic ring; $Y^{02}$ represents a divalent linking group not having an aromatic ring; and $X^{02}$ represents a carboxyl group, a cyano group, an amino group or a trialkoxysilyl group.

10. The method of forming a pattern of a layer containing a block copolymer according to claim 1, wherein the structural unit having no aromatic ring is at least one structural unit represented by any one of formulas shown below;

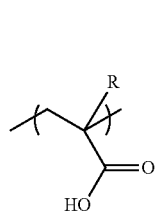 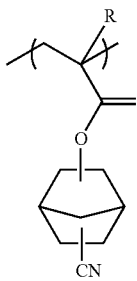 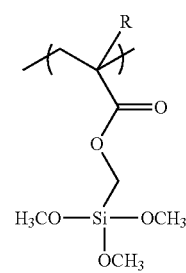

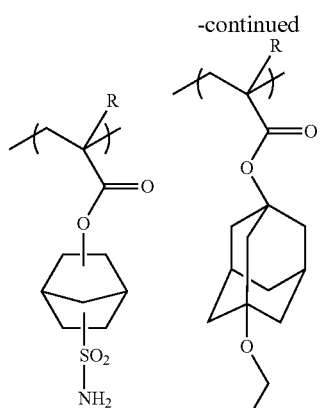

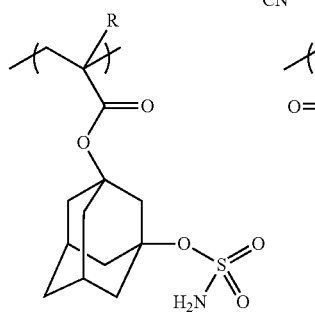

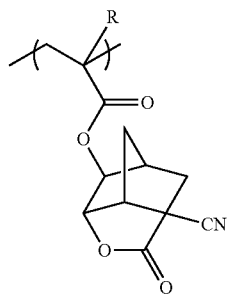

wherein R represents a hydrogen atom, an alkyl group of 1 to 5 carbon atoms or a halogenated alkyl group of 1 to 5 carbon atoms.

11. The method of forming a pattern of a layer containing a block copolymer according to claim 1, wherein the structural unit having an aromatic ring is at least one structural unit represented by general formula (a1-1) or (a1-2) shown below;

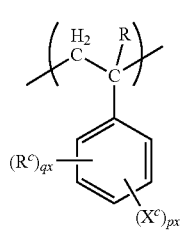

(a1-1)

-continued (a1-2)

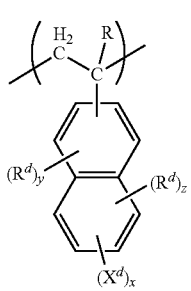

wherein R represents a hydrogen atom, an alkyl group of 1 to 5 carbon atoms, or a halogenated alkyl group of 1 to 5 carbon atoms; $X^c$ and $X^d$ each independently represents a hydrogen atom, a hydroxyl group, a cyano group or an organic group; $R^c$ and $R^d$ each independently represents a halogen atom, —$COOX^c$ (wherein $X^c$ represents a hydrogen atom or an organic group), an alkyl group of 1 to 5 carbon atoms or a halogenated alkyl group of 1 to 5 carbon atoms; px represents an integer of 0 to 3, qx represents an integer of 0 to 5, provided that px+qx is from 1 to 5, when qx is an integer of 2 or greater, the plurality of $R^c$ groups may be the same or different; x represents an integer of 0 to 3, y represents an integer of 0 to 3, and z represents an integer of 0 to 4, provided that x+y+z in formula (a1-2) is from 1 to 7, when y+z is an integer of 2 or greater, the plurality of $R^d$ groups may be the same or different.

12. The method of forming a pattern of a layer containing a block copolymer according to claim 1, wherein the amount of the structural unit having no aromatic ring, based on the combined total of all structural units constituting the resin component is preferably 5 to 90 mol %.

13. The method of forming a pattern of a layer containing a block copolymer according to claim 1, wherein
the structural unit having an aromatic ring is at least one structural unit represented by any one of general formulas shown below;

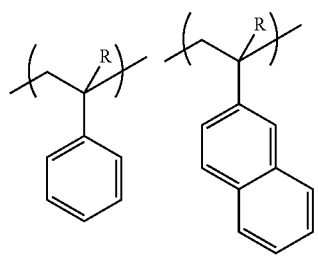

wherein R represents a hydrogen atom, an alkyl group of 1 to 5 carbon atoms or a halogenated alkyl group of 1 to 5 carbon atoms;
the structural unit having no aromatic ring is at least one structural unit represented by any one of formulas shown below;

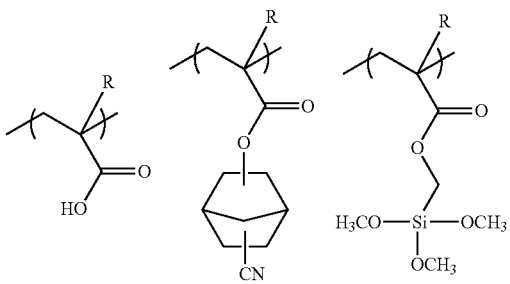

wherein R represents a hydrogen atom, an alkyl group of 1 to 5 carbon atoms or a halogenated alkyl group of 1 to 5 carbon atoms; and
the resin component includes at least one structural unit selected from the group consisting of structural units shown below;

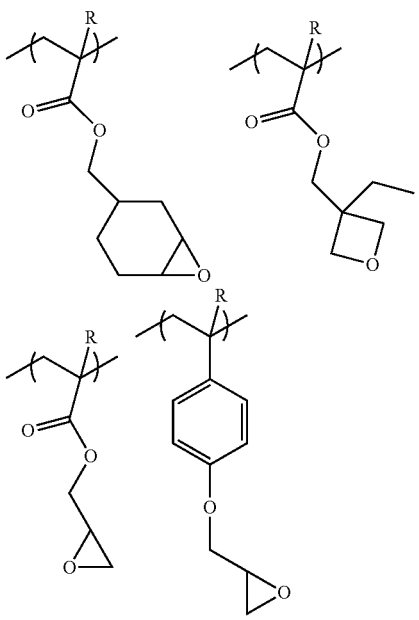

wherein R represents a hydrogen atom, an alkyl group of 1 to 5 carbon atoms or a halogenated alkyl group of 1 to 5 carbon atoms.

14. The method of forming a pattern of a layer containing a block copolymer according to claim 1, wherein
the block copolymer is at least one block copolymer selected from the group consisting of polystyrene-poly(methyl methacrylate) (PS-PMMA) block copolymers, polystyrene-poly(ethyl methacrylate) block copolymers, polystyrene-poly(t-butyl methacrylate) block copolymers, polystyrene-polymethacrylic acid block copolymers, polystyrene-poly(methyl acrylate) block copolymers, polystyrene-poly(ethyl acrylate) block copolymers, polystyrene-poly(t-butyl acrylate) block copolymers, and polystyrene-polyacrylic acid block copolymers.

* * * * *

UNITED STATES PATENT AND TRADEMARK OFFICE
CERTIFICATE OF CORRECTION

PATENT NO. : 9,029,073 B2  Page 1 of 2
APPLICATION NO. : 13/786007
DATED : May 12, 2015
INVENTOR(S) : Takahiro Senzaki, Ken Miyagi and Kenichiro Miyashita It is certified that error appears in the above-identified patent and that said Letters Patent is hereby corrected as shown below:

In the Specification

Col. 5, line 1, "α-substituted)" should be --(α -substituted)--.
Col. 5, line 57, "α-substituted)" should be --(α -substituted)--.
Col. 16, line 16, "—$(CH_2)_a$—$C(=O)$—$O$—$(CH_2)_b$," should be -- —$(CH_2)_a$,—$C(=O)$—$O$—$(CH_2)_b$,--.
Col. 24, line 20, after "or" insert -- —$O$—$R^{8'}$--.
Col. 25, lines 1-16:

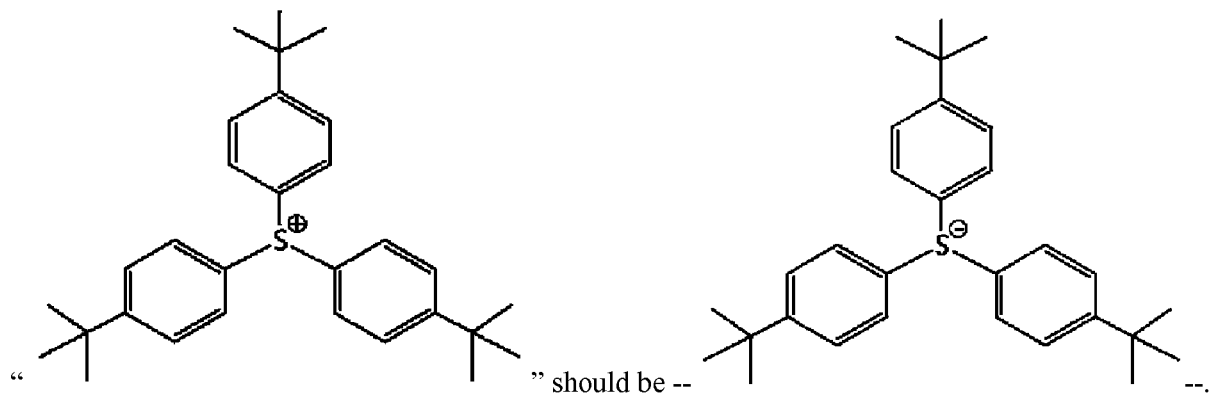

Signed and Sealed this
Eighth Day of March, 2016

Michelle K. Lee
*Director of the United States Patent and Trademark Office*

Col. 25, lines 26-37:
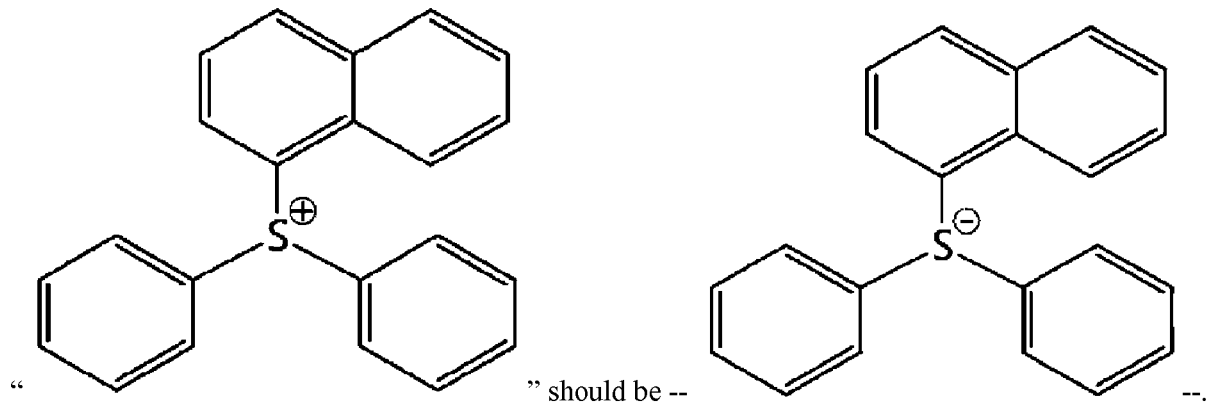
In the Claims
Col. 51, line 48 (claim 5), "—COOX$^c$" should be -- —COOX$^e$--.
Col. 51, line 48 (claim 5), "X$^c$" should be --X$^e$--.
Col. 54, line 53 (Claim 11), "claim 1," should be --claim 10,--.